(12) United States Patent
Bowles

(10) Patent No.: US 11,388,862 B2
(45) Date of Patent: Jul. 19, 2022

(54) GROW CABINET

(71) Applicant: Crescent Metal Products, Inc., Mentor, OH (US)

(72) Inventor: John L. Bowles, Eastlake, OH (US)

(73) Assignee: Crescent Metal Products, Inc., Mentor, OH (US)

( * ) Notice: Subject to any disclaimer, the term of this patent is extended or adjusted under 35 U.S.C. 154(b) by 189 days.

(21) Appl. No.: 16/897,417

(22) Filed: Jun. 10, 2020

(65) Prior Publication Data

US 2020/0404862 A1    Dec. 31, 2020

Related U.S. Application Data

(60) Provisional application No. 62/867,559, filed on Jun. 27, 2019.

(51) Int. Cl.
*A01G 9/24* (2006.01)
*F25B 21/04* (2006.01)

(52) U.S. Cl.
CPC ............. *A01G 9/246* (2013.01); *A01G 9/247* (2013.01); *A01G 9/249* (2019.05); *F25B 21/04* (2013.01); *A01G 2009/248* (2013.01); *F25B 2321/021* (2013.01); *F25B 2321/023* (2013.01)

(58) Field of Classification Search
CPC ........ A01G 9/246; A01G 9/247; A01G 9/249; F23B 2321/023; F23B 2321/021
See application file for complete search history.

(56) References Cited

U.S. PATENT DOCUMENTS

| | | |
|---|---|---|
| 5,584,183 A | 12/1996 | Wright |
| 6,255,103 B1 | 6/2001 | Tamaoki |
| 6,345,507 B1 | 2/2002 | Gillen |
| 6,725,598 B2 | 4/2004 | Yoneda |
| 2004/0025516 A1 | 2/2004 | Van Winkle |
| 2013/0180168 A1 | 7/2013 | Elliott |
| 2017/0347547 A1 | 12/2017 | Lu |
| 2018/0274827 A1 | 9/2018 | Kim |

*Primary Examiner* — Monica L Barlow
(74) *Attorney, Agent, or Firm* — Renner, Otto, Boisselle & Sklar, LLP

(57) ABSTRACT

A thermally controlled cabinet such as a grow cabinet having an internal chamber for containing objects such as plants, with a temperature control system that accurately and precisely maintains the temperature inside of the chamber.

20 Claims, 11 Drawing Sheets

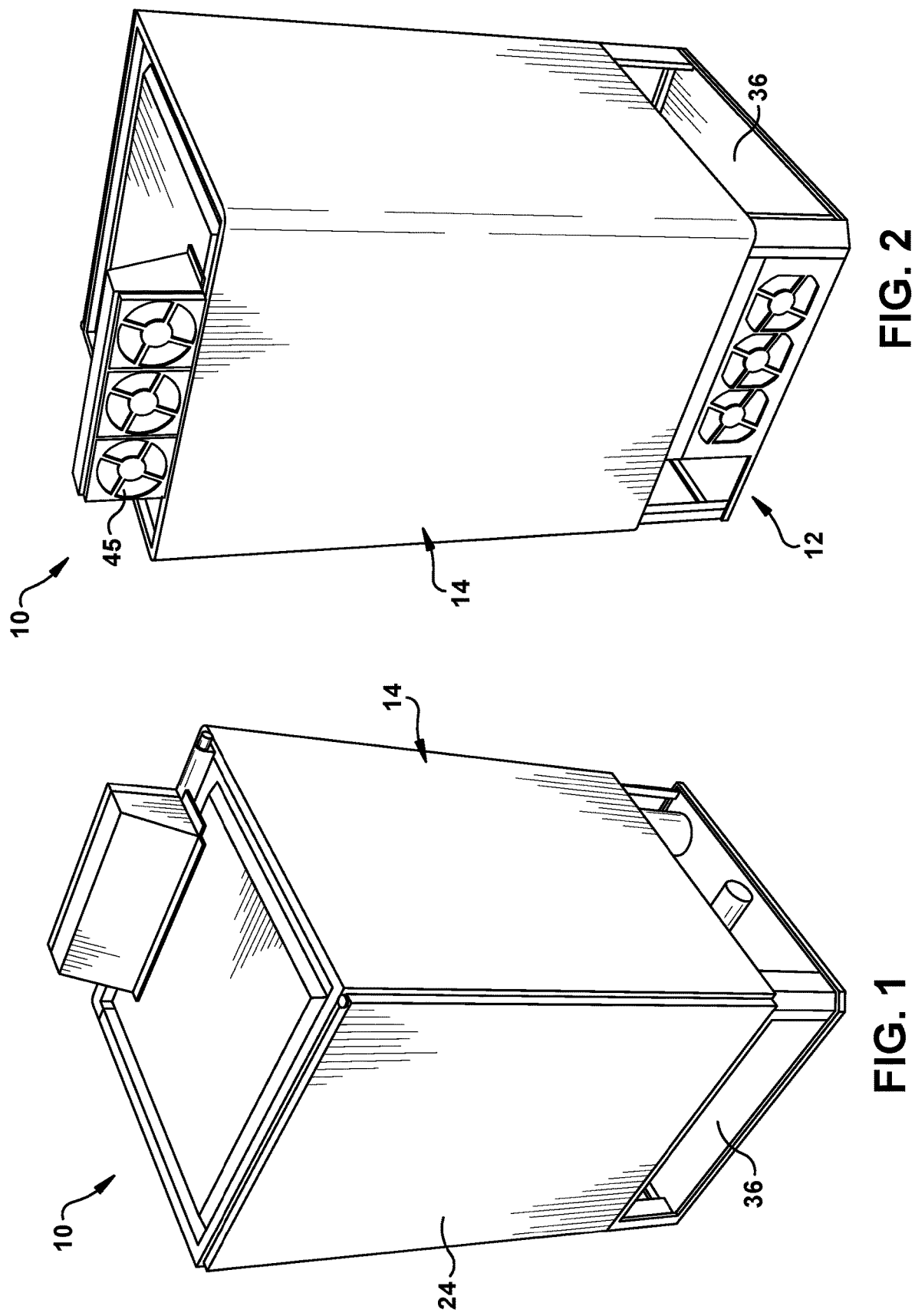

GROW CABINET

RELATED APPLICATIONS

This application claims the benefit of U.S. Provisional Application No. 62/867,559 filed Jun. 27, 2019, which is hereby incorporated herein by reference in its entirety.

FIELD OF INVENTION

The present invention relates to a grow cabinet having a grow chamber with lighting and temperature control for facilitating the growth of plants or the like in the grow chamber, and more generally to a cabinet having a chamber for containing items, with the provision of precise temperature control of the chamber.

BACKGROUND

Grow cabinets, sometimes referred to as grow boxes or cultivation cabinets, are used to recreate and control an environment for growing plants indoors or in small areas. Typically grow cabinets are used when there is a lack of available outdoor space, or where the outdoor conditions are unsuitable for growing particular types of plants. Grow cabinets also can help to protect plants against disease or pests.

Typically a grow cabinet will include a grow chamber for growing the plants, a lighting system for providing light to the plants, a nutrient supply system for providing nutrients to the plants, and a ventilation system that is used to circulate air and control humidity and/or temperature of the environment inside the grow chamber for facilitating growth of the plants. Conventional grow cabinets, however, are often inefficient and do not accurately control the temperature inside of the grow chamber.

SUMMARY OF INVENTION

The present invention provides a temperature controlled cabinet, such as a grow cabinet, which provides accurate and precise temperature control of an internal chamber of the cabinet for maintaining items, such as plants, at a particular temperature.

More particularly, the temperature controlled cabinet includes a thermoelectric temperature control system that enhances temperature accuracy and provides precise control of the temperature inside of the chamber, such as to facilitate growth of plants or the like inside of a grow chamber of the grow cabinet.

According to an aspect of the invention, a grow cabinet includes: a housing; a grow chamber inside of the housing for containing a living object; a light source and/or nutrient supply for facilitating growth of the living object; and a thermoelectric temperature control system for controlling temperature inside the grow chamber, the thermoelectric temperature control system comprising: a work liquid circuit having a work heat exchanger in thermal communication with an environment inside of the grow chamber; an ambient liquid circuit having an ambient heat exchanger in thermal communication with an ambient environment outside of the grow chamber; and a thermoelectric heat exchanger assembly interposed between the work liquid circuit and the ambient liquid circuit, the thermoelectric heat exchanger assembly having: a work side having a work liquid flow passage fluidly connected to the work liquid circuit; an ambient side having an ambient liquid flow passage fluidly connected to the ambient liquid circuit; and a thermoelectric device interposed between the work liquid flow passage and the ambient liquid flow passage, the thermoelectric device having a first side in thermal communication with the work liquid flow passage, and having a second side that is in thermal communication with the ambient liquid flow passage; wherein the thermoelectric device is configured to transfer heat between the ambient liquid circuit and the work liquid circuit for achieving and/or maintaining a desired temperature of the grow chamber.

The work side of the thermoelectric heat exchanger assembly may be configured to maximize thermal transfer with an external environment on the ambient side, and may be configured to minimize thermal transfer with the external environment on the work side. Such a configuration minimizes thermal load on the work side during cooling of the grow chamber and maximizes thermal load on the ambient side during heating of the grow chamber to achieve a maximum differential in liquid temperatures on the opposite sides of the thermoelectric device. This enables the thermoelectric device to utilize its maximum potential in transferring heat between the respective liquid circuits, thereby enhancing accuracy in the temperature control.

More particularly, the thermoelectric heat exchanger assembly may be configured such that an overall thermal flux of the ambient side of the assembly is greater than an overall thermal flux of the work side of the assembly. For example, one or more parts of the thermoelectric heat exchanger assembly that form at least a portion of the ambient side may be made of high thermal conductivity material(s), while one or more parts of the assembly that form at least a portion of the work side may be made of low thermal conductivity material(s), thereby providing the difference in thermal conductivity and thermal transfer between the different sides of the assembly. Alternatively or additionally, the work side may include thermal insulation materials that further thermally insulate the work side relative to the ambient side to enhance efficiency.

According to another aspect of the invention, a temperature controlled cabinet such as a grow cabinet, includes: a housing; a chamber inside of the housing for containing items; and a thermoelectric temperature control system for controlling temperature inside the chamber, the thermoelectric temperature control system comprising: a work liquid circuit having a work heat exchanger in thermal communication with an environment inside of the chamber; an ambient liquid circuit having an ambient heat exchanger in thermal communication with an ambient environment outside of the chamber; and a thermoelectric heat exchanger assembly interposed between the work liquid circuit and the ambient liquid circuit, the thermoelectric heat exchanger assembly having: a work side having a work waterblock that at least partially forms a work liquid flow passage that is fluidly connected to the work liquid circuit; an ambient side having an ambient waterblock that at least partially forms an ambient liquid flow passage that is fluidly connected to the ambient liquid circuit; and a thermoelectric device interposed between the work liquid flow passage and the ambient liquid flow passage, the thermoelectric device having a first side in thermal communication with the work liquid flow passage, and having a second side that is in thermal communication with the ambient liquid flow passage for transferring heat between the ambient liquid circuit and the work liquid circuit; wherein the ambient waterblock is made of a first material, and the work waterblock is made of a second material, the first material of the ambient waterblock having a greater thermal conductivity than the second material of the work waterblock, such that thermal transfer with an external environment on the ambient side is maximized, and thermal transfer with the external environment on the work side is minimized.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 1 is a front perspective view of an exemplary grow cabinet having an exemplary thermoelectric temperature control system according to an embodiment of the invention.

FIG. 2 is a rear perspective view of the grow cabinet.

DETAILED DESCRIPTION

Figure 3:
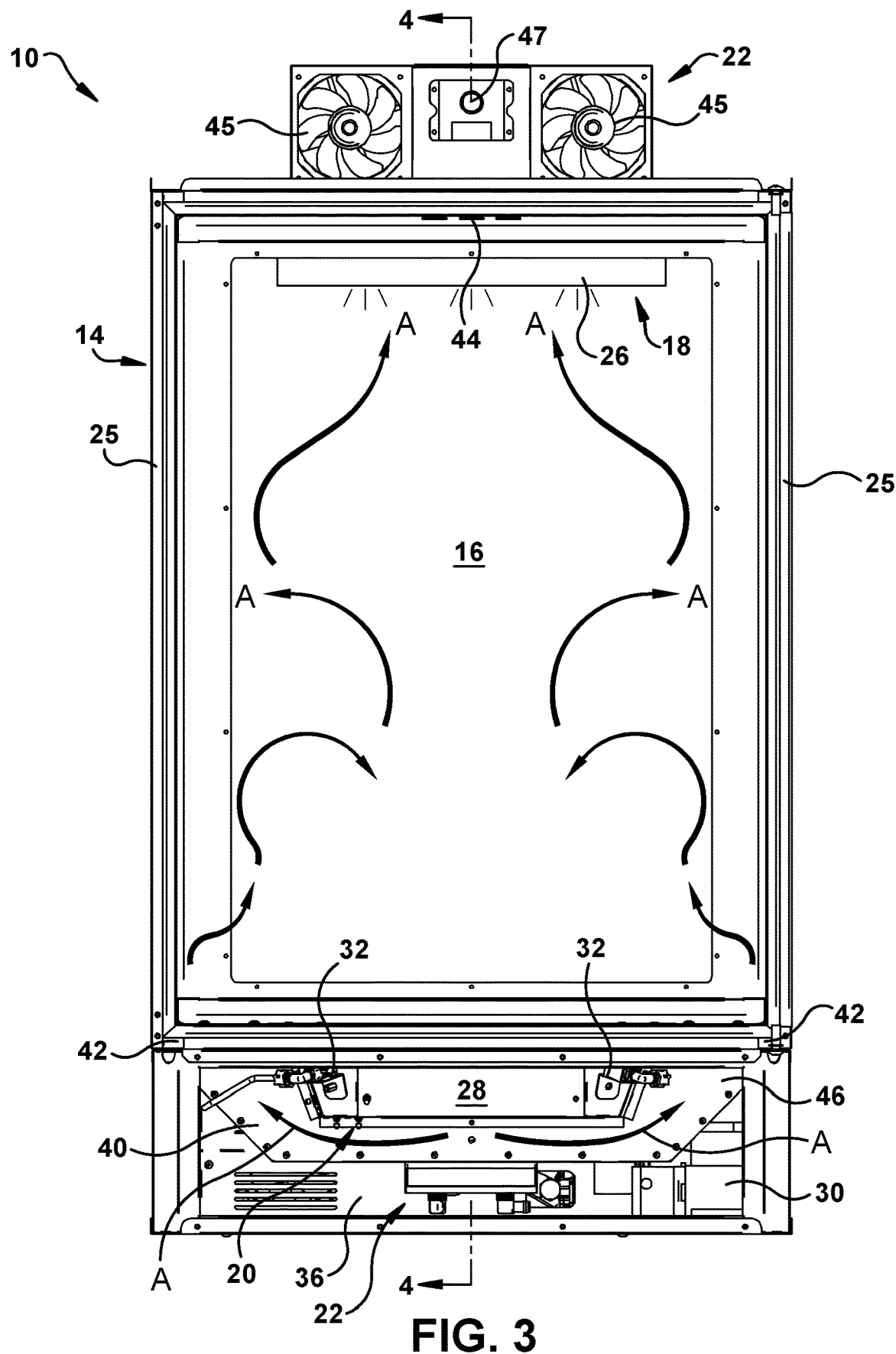
FIG. 3 is a cross-sectional rear view of the grow cabinet.

Referring to FIGS. 1-4, an exemplary grow cabinet 10 is shown. The grow cabinet 10 generally includes a housing 14 having an internal grow chamber 16 for growing living objects, such as plants, a lighting system 18 for providing light to the plants, a nutrient supply system 20 for providing nutrients to the plants, a ventilation system 22 that is used to intake, circulate and/or exhaust air inside the grow chamber 16, and an exemplary thermoelectric temperature control system 12 for controlling temperature inside of the grow chamber 16 for facilitating growth of the plants.

The housing 14 may be any suitable housing for providing environmental control to the grow chamber 16. As shown, the housing 14 includes a door 24 or other closure for enclosing the grow chamber 16 and for providing access to the inside of the grow chamber 16. In the illustrated embodiment, the door 24 is hinged to open outwardly from a front side of the housing 14. The walls 25 of the housing 14 may be made of any suitable material for withstanding the environmental conditions of the grow chamber 16. For example, the walls 25 may be formed with aluminum, stainless steel, fiberglass, or other suitable materials, particularly those that are capable of withstanding corrosion in a humid or moist environment. The walls 25 of the housing 14, including the door 24, may be a double-walled structure, which may be filled with insulation, for insulating the housing 14 to provide improved temperature control of the temperature inside of the chamber 16.

The lighting system 18 may be any suitable lighting system having one or more light sources 26 for providing light to the plants to promote growth. For example, the light sources 26 may include light emitting diode (LED) lighting, high-intensity discharge (HID) lighting, compact fluorescent light (CFL), or other suitable light sources, which may provide any suitable light across the light spectrum, such as ultraviolet light, as may be desired. In the illustrated embodiment, the light sources 26 are shown in an array at the top of the grow chamber 16, however it is understood that the light sources 26 may be provided at any location within the grow chamber 16 as may be desirable for promoting growth of the plants or the like.

The nutrient supply system 20 may be any suitable nutrient system for providing nutrients to the plants, such as a hydroponic, aeroponic, aggregate (e.g., soil), or other such nutrient system. In the illustrated embodiment, the nutrient system 20 includes an aeroponics system (also referred to with reference numeral 20) which enables the plants to grow in a moist air environment without the use of soil or other such medium. As shown, in exemplary embodiments the aeroponics system 20 includes a root chamber 28, one or more aeroponics pumps 30, and one or more aeroponics emitters 32. The root chamber 28 is disposed toward a bottom portion of the grow chamber 16 and is configured to contain suspended roots of the plants and provide a nutrient and oxygen-rich environment that is exposed to the suspended roots. The one or more aeroponics pumps 30 are configured to supply water and/or other nutrients from a water/nutrient source (not shown) to the one or more aeroponics emitters 32. The aeroponics emitters 32 may include sprayers, misters, foggers or other suitable devices that create a fine mist of the nutrient/water solution delivered from the aeroponics pumps 30 to the suspended plant roots.

The ventilation system 22 may be any suitable ventilation system that is used to intake, circulate and/or exhaust air inside the grow chamber. For example, as shown in the illustrated embodiment, the ventilation system 22 includes an air intake 34 disposed in a lower cavity 36 below the housing 14 that cooperates with a fan 38 or blower, such as an impeller fan, for blowing air into the grow chamber 16. As shown, the lower cavity 36 is open at one or more sides enabling easy ingress of ambient air into the lower cavity 36 and across the fan 34.

As will be discussed in further detail below, the air intake 34 is configured to move the intake air across a portion of the thermoelectric cooling system 12 to closely regulate and control the temperature of the grow chamber 16. The intake air is then moved via the fan 38 into a duct 40, which directs the air into the grow chamber 16 via intake air inlets 42. As shown, the intake air in the duct 40 is isolated from the root chamber 28, and the duct 40 is configured to direct the intake air outward toward the walls 25 of the housing 14 (as shown with the directional flow lines A in FIG. 3, for example). In exemplary embodiments, the ventilation system 22 is configured to circulate the air A within the chamber 16 with sufficient turbulence and velocity to gently shake the leaves of the plants to promote growth. The ventilation system 22 also includes an air exhaust 44 for egress of the air A from the grow chamber 16. As shown, the air exhaust 44 is disposed in an upper wall of the housing 14 and cooperates with one or more exhaust fans 45 or other suitable blower for drawing the air A out of the grow chamber 16.

In exemplary embodiments, the grow chamber 16 also includes one or more filters for filtering the air and or nutrient solution delivered to the plants. For example, a UV-light filter 46 may be utilized for filtering and/or sterilizing the intake air of contaminants, such as bacteria, that could harm the plants. The UV-light filter 46 may include a UV-light source that is directed to the intake air upstream of the air intake inlets 42, for example, as shown in FIG. 3. The grow chamber 16 also may include a water filtering system for filtering the nutrient solution to remove particulates that may be harmful to the plants or damage the aeroponics system. In addition, a filter 47, such as a carbon filter, may be utilized in cooperation with the air exhaust 44 to filter and clean the exhaust air to prevent smells from the chamber 16 escaping into areas around the grow cabinet 10.

Figure 5:
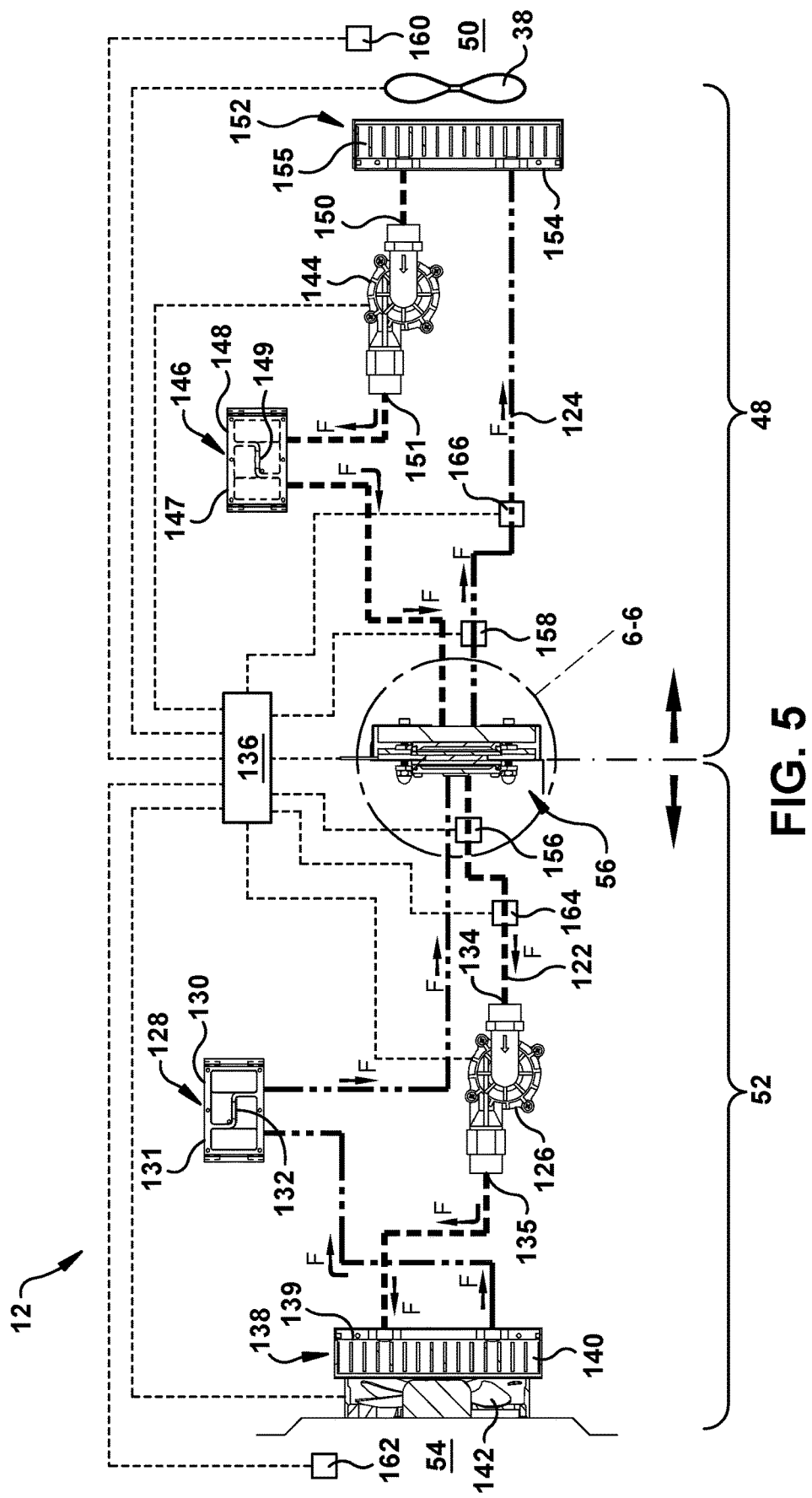
FIG. 5 is a schematic diagram of an exemplary temperature control system for the grow cabinet according to an embodiment of the invention.
Figure 6:
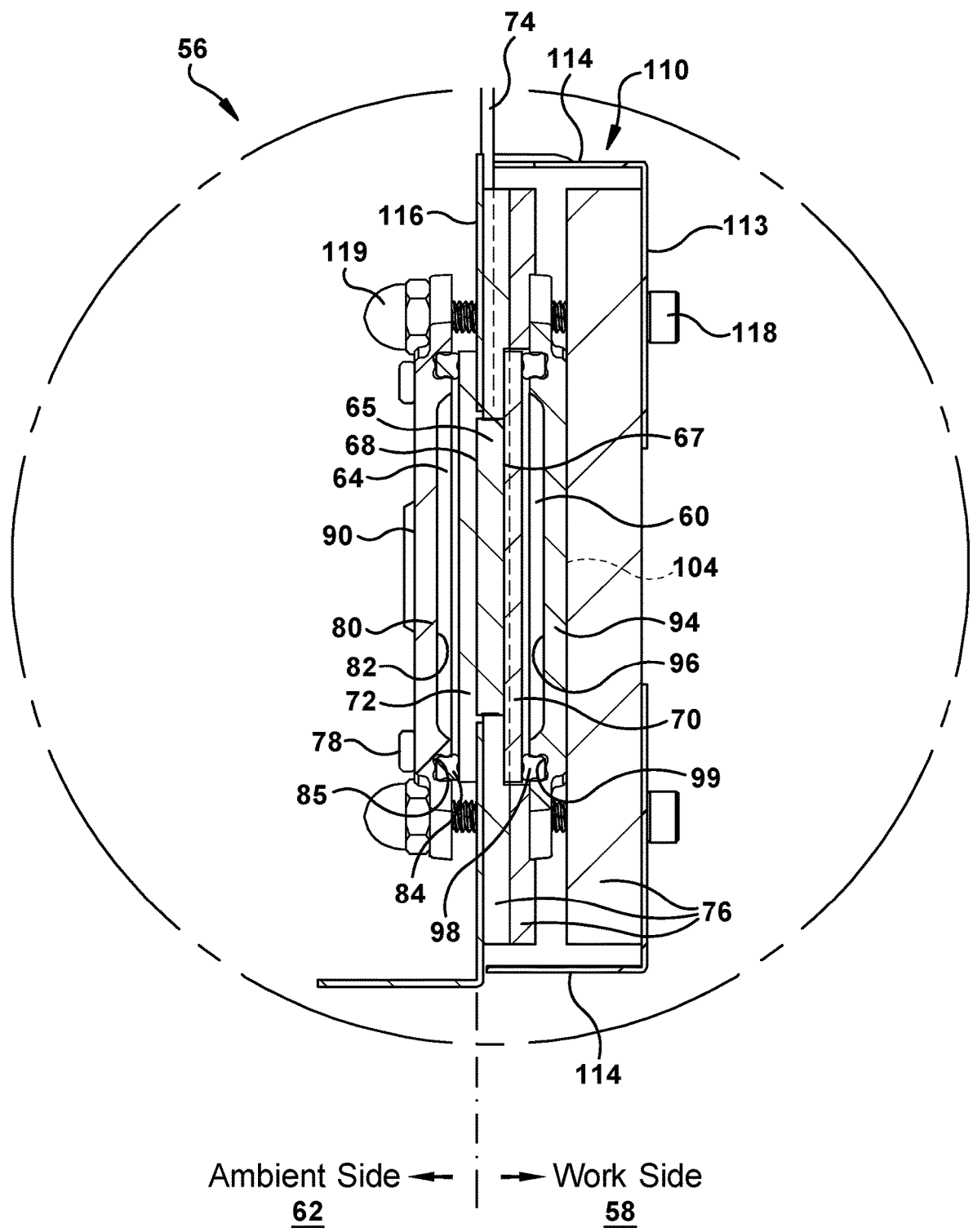
FIG. 6 is an enlarged view of section 6-6 in FIG. 5 showing an exemplary thermoelectric heat exchanger assembly according to an embodiment of the invention.
Figure 7:
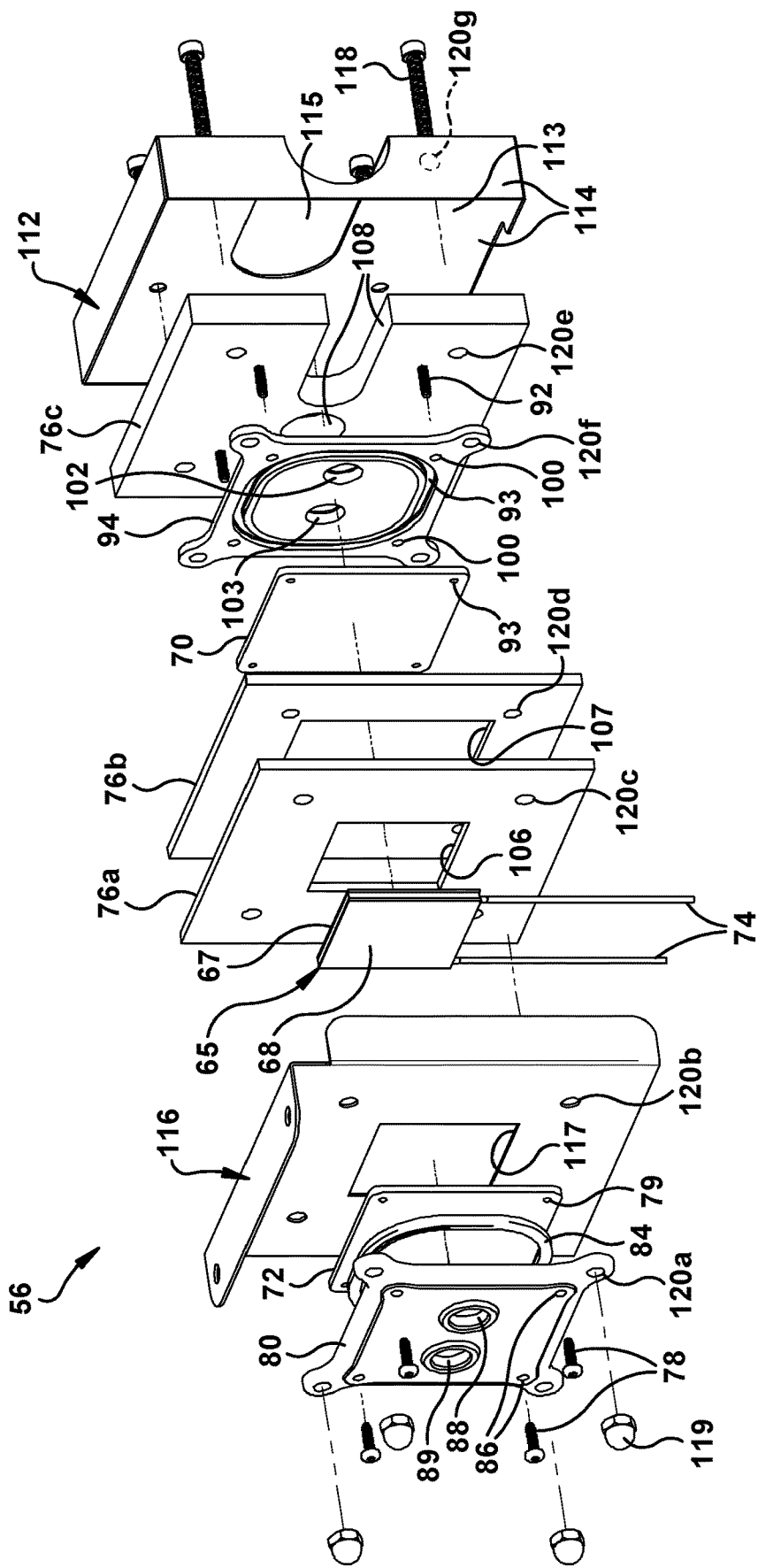
FIG. 7 is an exploded perspective view of the thermoelectric heat exchanger assembly.

Referring now to FIGS. 5-7, the exemplary thermoelectric temperature control system 12 is shown in greater detail. The thermoelectric temperature control system 12 generally includes a work liquid circuit 48 in thermal communication with the environment 50 inside of the grow chamber 16, an ambient liquid circuit 52 in thermal communication with the ambient environment 54 outside of the grow chamber 16, and a thermoelectric heat exchanger assembly 56 interposed between the work liquid circuit 48 and the ambient liquid circuit 52 for transferring heat between the ambient and work liquid circuits 48, 52.

Referring particularly to FIGS. 6 and 7, the thermoelectric heat exchanger assembly 56 generally includes a work side 58 having at least one work liquid flow passage 60 fluidly connected to the work liquid circuit 48, an ambient side 62 having at least one ambient liquid flow passage 64 fluidly connected to the ambient liquid circuit 52, and a thermoelectric device 65 interposed between the work liquid flow passage 60 and the ambient liquid flow passage 64. The thermoelectric device 65 has a first (work) side 67 in thermal communication with the work liquid flow passage 60, and has a second (ambient) side 68, opposite the first (work) side 67, that is in thermal communication with the ambient liquid flow passage 64. As will be discussed in further detail below, the thermoelectric heat exchanger assembly 56 is constructed to maximize thermal transfer with its external environment on the ambient side 62 and is configured to minimize thermal transfer with its external environment on the work side 58. Such a configuration enables a maximum differential in liquid temperatures in the respective ambient and liquid flow passages 60, 64 on the opposite sides of the thermoelectric device 65, thereby enhancing temperature control of the system 12.

The thermoelectric device 65 may be any suitable electronic device that utilizes the thermoelectric principle (also commonly referred to as the Peltier effect) to generate a thermal flux between the opposite first and second sides 67, 68 of the device 65 in response to an electric current (e.g., direct current) flowing through the thermoelectric device (i.e., Peltier device) 65. Generally, such thermoelectric devices 65 are electronic circuits that utilize two different types of semiconductors, usually an alternating array of n-type and p-type semiconductors, to form a solid-state heat pump. In exemplary embodiments, the semiconductors are placed thermally in parallel to each other and electrically in series and then joined with thermal conduction plates 70, 72 on respective sides 67,68 of the thermoelectric device 65.

The thermoelectric device 65 includes electrical conduits, such as wires 74, that provide the electrical current to the device 65.

When a voltage is applied to the free ends of the two types of semiconductors of the thermoelectric device 65 via the wires 74, there is a flow of DC current across the junctions of the semiconductors causing a temperature difference. This causes one side of the device 65 to become cooler while the other side of the device 65 becomes hotter, depending on the direction of the electrical current. Accordingly, a change in the direction of the current also will change which side of the device 65 is the cold (cool) side and which side is the hot (warm) side. As discussed in further detail below, the cold (cool) side of the thermoelectric device 65 will absorb heat from the associated liquid circuit on that side (e.g., ambient circuit 52 or work circuit 48) via the associated liquid flow passage (e.g., 60 or 64) that is in thermal communication with the cool side of the device 65, in which this heat is then moved via the thermoelectric device 65 to the opposite hot side of the device 65 where the heat is transferred away via the other liquid circuit via its associated liquid flow passage in thermal communication with the hot side of the device 65, thereby controlling the temperature of the chamber as desired.

Such thermoelectric devices 65 have several advantages over traditional refrigerant-based systems (e.g., vapor-compression systems). One such advantage is that the thermoelectric device 65 may have no moving parts and instead relies on the transfer of heat via the solid-state junctions and direction of current flow. This increases the lifespan of the system 12 and may minimize the amount of maintenance required. Moreover, such a system 12 also may not utilize refrigerants in its operation, which such refrigerants are known to have deleterious environmental impact. In addition, because such thermoelectric devices 65 are controlled by the current flowing thereacross, the temperature may be tightly controlled within several degrees Fahrenheit, and more particularly to within fractions of a degree Fahrenheit. Furthermore, such a thermoelectric device 65 typically requires much less space than a conventional refrigeration system, and also may be modular in that additional thermoelectric devices may be added or subtracted from the system 12 depending on the temperature control requirements of the system 12 (e.g., size of the chamber to be controlled, amount of such change in temperature, etc.), as would be understood by those having ordinary skill in the art.

One possible disadvantage of a thermoelectric device is that the system may be inefficient. In particular, the present inventor discovered through experimentation, some of which is described below, that a thermoelectric heat exchanger assembly having a thermoelectric device may experience significant thermal transfer (e.g., heat loss) on the work side of the device due to outside environmental influence, which impacts the desired amount of thermal transfer (on a mass liquid flow basis) into or out of the work liquid circuit. This, in turn, impacts the desired amount of thermal flux that may be provided by the thermoelectric device 65.

An aspect of the present invention addresses such issues, and specifically constructs the thermoelectric heat exchanger assembly 56 to maximize thermal transfer with an external environment on the ambient side 62, and is configured to minimize thermal transfer with the external environment on the work side 58. More particularly, the thermoelectric heat exchanger assembly 56 may be configured such that an overall thermal flux of the ambient side 62 of the assembly 56 is greater than an overall thermal flux of the work side 58 of the assembly. Such an exemplary configuration of the thermoelectric heat exchanger assembly 56 therefore minimizes thermal load on the work side 58 during cooling of the grow chamber 16, and maximizes thermal load on the ambient side 62 during heating of the grow chamber 16, to achieve a maximum differential in liquid temperatures in the liquid flow passages 60, 64 on the opposite sides of the thermoelectric device 65. This enables the thermoelectric device 65 to utilize its maximum potential (or near maximum potential) in transferring heat between the respective ambient and work liquid circuits 52, 48, thereby enhancing accuracy in the temperature control of the system 12.

In exemplary embodiments, the difference in thermal conductivity and thermal transfer of the work side 58 relative to the ambient side 62 of the thermoelectric heat exchanger assembly 56 may be provided by the types of materials chosen for each side of the assembly 56. For example, in exemplary embodiments one or more parts of the thermoelectric heat exchanger assembly 56 that form at least a portion of the ambient side 62 may be made of high thermal conductivity materials, while one or more parts of the assembly 56 that form at least a portion of the work side 58 may be made of low thermal conductivity materials, thereby providing the ambient side 62 with a higher overall thermal flux with its external environment relative to the work side 58. More particularly, in exemplary embodiments an overall average thermal flux of the portions forming and/or surrounding the ambient liquid flow passage 64 of the thermoelectric heat exchanger assembly 56 may be greater than an overall average thermal flux of portions forming and/or surrounding the work liquid flow passage 60 of the thermoelectric heat exchanger assembly 56, which may be achieved by the materials chosen for such portions. Alternatively or additionally, the work side 58 of the thermoelectric heat exchanger assembly 56 may be more thermally insulative than the ambient side 62 of the thermoelectric heat exchanger assembly 56. For example, in exemplary embodiments the work side 58 may include thermal insulation 76 that is configured to further thermally insulate the work side 58 relative to the ambient side 62 to enhance efficiency.

Generally, such exemplary feature(s) of the exemplary thermoelectric heat exchanger assembly 56 are configured to maximize the thermally insulative properties and/or minimize the thermally conductive properties on the work side 58 of the assembly to minimize the amount outside environmental influence on the thermal transfer characteristics (e.g., on a mass liquid flow basis) into or out of the work side 58 of the thermoelectric heat exchanger assembly 56. In addition, such exemplary feature(s) of the exemplary thermoelectric heat exchanger assembly 56 are configured to maximize the thermally conductive properties and/or minimize the thermally insulative properties on the ambient side 62 of the assembly to maximize the amount outside environmental influence on the thermal transfer characteristics (e.g., on a mass liquid flow basis) into or out of the ambient side 62 of the thermoelectric heat exchanger assembly 56. Such exemplary feature(s) of the exemplary thermoelectric heat exchanger assembly 56 have been found to significantly improve the temperature control and efficiency of the thermoelectric temperature control system 12.

Still referring particularly to FIGS. 6 and 7, the various parts forming the ambient side 62 and the work side 58 of the thermoelectric heat exchanger assembly 56 will now be described in further detail. As discussed above, the thermoelectric device 65 is configured to transfer heat between the first (work) side 67 and the second (ambient) side 68 of the thermoelectric device 65, in which the direction of thermal transfer will depend on the direction of current flowing through the device 65, as supplied via the electrical conduits 74. In exemplary embodiments, the thermoelectric device 65 thus serves as the divider between the work side 58 and the ambient side 62 of the thermoelectric heat exchanger assembly 56. In the illustrated embodiment of FIG. 6, for example, the ambient side 62 of the thermoelectric heat exchanger assembly 56 is considered the portion toward the left of the second (ambient) side 68 of the thermoelectric device 65, whereas the work side 58 of the thermoelectric heat exchanger assembly 56 is considered the portion toward the right of the first (work) side 67 of the thermoelectric device 65, including the peripheral edges of the thermoelectric device 65. It is understood, however, that the division between the work side 58 and the ambient side 62 of the thermoelectric heat exchanger assembly 56 may be different depending on the construction of the thermoelectric heat exchanger assembly 56, as would be understood by those having ordinary skill in the art.

As shown in the illustrated embodiment, the ambient side 62 of the thermoelectric heat exchanger assembly 56 includes an ambient thermal conduction plate 72 that is in thermal contact with the second (ambient) side 68 of the thermoelectric device 65. The ambient thermal conduction plate 72 is configured to enhance the thermal conduction between the liquid in the ambient liquid flow passage 64 on the liquid side of the plate 72 and the ambient side 68 of the thermoelectric device 65 on the opposite side of the plate 72. The ambient thermal conduction plate 72 also serves as a heat spreader that is configured to more uniformly transfer the heat across the plate 72. The ambient thermal conduction plate 72 also serves as a liquid divider that forms at least a portion of the ambient liquid flow passage 64 and prevents the liquid (e.g., water) in the ambient liquid circuit 52 from contacting the electronic components on the ambient side 68 of the thermoelectric device 65. The ambient thermal conduction plate 72 may be fixed in the assembly in any suitable manner, such as by fasteners, adhesives, or by sandwiching the plate 72 between other portions of the thermoelectric heat exchanger assembly 56. In the illustrated embodiment, the ambient thermal conduction plate 72 is fixed with fasteners 78, such as bolts, that are received in corresponding fastener receivers 79 in the plate 72, such as threaded bores that threadably receive the bolts.

In the illustrated embodiment, the ambient thermal conduction plate 72 is configured as a thin flat plate which is adjacent to the ambient side 68 of the thermoelectric device 65. It is understood, however, that other suitable forms of the ambient thermal conduction plate 72 may be provided, including non-planar or block-like forms of the plate 72. In exemplary embodiments, the ambient thermal conduction plate 72 is made of a material with a high-thermal conductivity, such as metal or metal alloy, and preferably such a material that is also corrosion resistant to the liquid running through the ambient liquid flow passage 64. For example, the ambient thermal conduction plate 72 may be made of copper, brass, aluminum, or the like. In the illustrated embodiment, the ambient thermal conduction plate 72 is made of copper. In exemplary, embodiments a thermally conductive paste may be disposed between the ambient thermal conduction plate 72 and the ambient side 68 of the thermoelectric device 65 for enhancing thermal contact between the plate 72 and the thermoelectric device 65, thereby enhancing heat transfer and temperature uniformity across the plate 72.

As shown, the ambient side 62 of the thermoelectric heat exchanger assembly 56 also includes an ambient waterblock 80 that cooperates with the ambient thermal conduction plate 72 to at least partially form the ambient liquid flow passage 64. In the illustrated embodiment, the ambient waterblock 80 is formed as single block or plate with a recessed cavity 82 that forms a portion of the ambient liquid flow passage 64. In exemplary embodiments, the ambient liquid flow passage 64 is formed as a single ambient liquid chamber which extends across a majority of the ambient thermal conduction plate 72 to enhance surface area. It is understood, however, that other suitable forms of the ambient waterblock 80 may be provided, including segmented or non-planar forms, which may be configured to form one or more liquid flow passages therein, as would be understood by those having ordinary skill in the art. It is also understood that the term "waterblock" as used herein is utilized as a term of art for a heat transfer component through which liquid flows, and that although the working liquid of the ambient liquid circuit 52 may be water (e.g., distilled water), that other forms of liquid may be utilized with the ambient waterblock 80 and other parts of the thermoelectric heat exchanger assembly 56 for providing thermal transfer in the system as may be desired.

In exemplary embodiments, the ambient waterblock 80 is sealingly engaged against the ambient thermal conduction plate 72 with a seal 84, gasket or other suitable sealing surface for forming a leak-tight connection that contains the liquid of the ambient circuit to within the ambient liquid flow passage. In the illustrated embodiment, the ambient waterblock 80 includes a surface groove 85 in which the seal 84, such as an elastomeric seal, is disposed for encompassing the recessed cavity 82. The ambient waterblock 80 may be attached to the ambient thermal conduction plate with suitable fasteners or other suitable forms of attachment. For example, in the illustrated embodiment, the ambient waterblock 80 includes fastener receivers 86, such as threaded bores, that receive the fasteners 78 which are received by the fastener receivers 79 of the ambient thermal conduction plate 72.

The ambient waterblock 80 also includes ambient liquid ports 88, 89 which are in liquid communication with the ambient liquid flow passage 64 for enabling liquid flow into and out of the ambient liquid passage 64. In the illustrated embodiment, the ambient liquid ports 88, 89 are disposed on a backside of the ambient waterblock 80 and are fluidly connected to the ambient liquid flow passage 64 via corresponding through-passages that extend through the ambient waterblock 80. In exemplary embodiments, the ambient liquid ports 88, 89 include corresponding ambient connector portions 90, such as internally threaded bores or locking collars, which are adapted for connection to suitable liquid conduits of the ambient liquid circuit 52, such as one or more rigid and/or flexible pipes, tubes, or the like. In this manner, the ambient liquid circuit 52 may supply liquid flow to the ambient liquid flow passage 64 via one of the ambient liquid ports (e.g., ambient inlet port 88), and an ambient outlet liquid conduit of the ambient liquid circuit may convey liquid out of the ambient liquid flow passage 64 via the other ambient liquid port (e.g., ambient outlet port 89).

In exemplary embodiments, one or more portions forming the internal ambient liquid flow passage 64 may include turbulizers along the surface thereof for enhancing turbulent liquid flow characteristics of the liquid within the ambient liquid flow passage 64, or chamber. For example, in exemplary embodiments, the ambient thermal conduction plate 72 may have a plurality of turbulizers in the form of micro-fins or other suitable protrusions disposed along the portion of the surface that at least partially forms the ambient liquid flow passage 64. Alternatively or additionally, the recessed surface 82 of the ambient waterblock 80 forming a portion of the ambient liquid flow passage 64 also may include a plurality of turbulizers for promoting turbulent flow.

As discussed above, one or more parts of the thermoelectric heat exchanger assembly 56 that form at least a portion of the ambient side 62 of the assembly may be made of high thermal conductivity materials to enhance the thermal flux of the ambient side 62 with its external environment. In exemplary embodiments, for example, one or more portions of the ambient waterblock 80 may be formed from high thermal conductivity materials for maximizing the influence of the external ambient environment on the thermal transfer characteristics (e.g., on a mass liquid flow basis) of the ambient side 62 of the thermoelectric heat exchanger assembly 56. Such high thermal conductivity materials may have a thermal conductivity in the range of about 50 W/m-K to 500 W/m-K, or greater, more particularly in the range from about 100 W/m-K to 400 W/m-K. In the illustrated embodiment, for example, the ambient waterblock 80 is made of copper (about 342 W/m-K to 413 W/m-K), but could be made of aluminum (about 220 W/m-K to 237 W/m-K) or copper alloy (e.g., brass (about 111 W/m-K)), for maximizing such thermal flux with the external environment surrounding the ambient side (e.g., the ambient environment). In addition, as shown in the illustrated embodiment, the ambient waterblock 80 may have a relatively large surface area that is substantially exposed to the ambient environment, such as being devoid of insulation or other coverings surrounding the ambient waterblock 80. This minimizes the thermally insulative properties on the ambient side 62 of the assembly 56 to maximize the amount outside environmental influence of thermal transfer into or out of the ambient liquid circuit 52, as will be discussed in further detail below.

Still referring particularly to FIGS. 6 and 7, the work side of the thermoelectric heat exchanger assembly 56 includes a work thermal conduction plate 70 that is in thermal contact with the work side 67 of the thermoelectric device 65. Similarly to the ambient thermal conduction plate 72, the work thermal conduction plate 70 is configured to enhance the thermal conduction between the liquid in the work liquid flow passage 60 on the liquid side of the plate 70 and the work side 67 of the thermoelectric device 65 on the opposite side of the plate 70. The work thermal conduction plate 70 also serves as a heat spreader that is configured to more uniformly transfer the heat across the plate 70. The work thermal conduction plate 70 also serves as a liquid divider that forms at least a portion of the work liquid flow passage 60 and prevents the liquid (e.g., water) in the work liquid circuit 48 from contacting the electronic components on the work side 67 of the thermoelectric device 65. The work thermal conduction plate 70 may be fixed in the assembly in any suitable manner, such as by fasteners, adhesives, or by sandwiching the plate 70 between other portions of the thermoelectric heat exchanger assembly 56. In the illustrated embodiment, the work thermal conduction plate 70 is fixed with fasteners 92, such as bolts, that are received in corresponding fastener receivers 93 in the plate 70, such as threaded bores that threadably receive the bolts.

In the illustrated embodiment, the work thermal conduction plate 70 is configured as a thin flat plate which is adjacent to the ambient side 68 of the thermoelectric device 65. It is understood, however, that other suitable forms of the work thermal conduction plate 70 may be provided, including non-planar or block-like forms of the plate 70. In exemplary embodiments, the work thermal conduction plate 70 is made of a material with a high-thermal conductivity, such as a metal or metal alloy, and preferably such a material that is also corrosion resistant to the liquid running through the work liquid flow passage 60. For example, the work thermal conduction plate 70 may be made of copper, brass, aluminum, or the like. In the illustrated embodiment, the work thermal conduction plate 70 is made of copper. In exemplary, embodiments a thermally conductive paste may be disposed between the work thermal conduction plate 70 and the work side 67 of the thermoelectric device 65 for enhancing thermal contact between the plate 70 and the thermoelectric device 65, thereby enhancing heat transfer and temperature uniformity across the plate 70.

As shown, the work side 58 of the thermoelectric heat exchanger assembly 56 also includes a work waterblock 94 that cooperates with the work thermal conduction plate 70 to at least partially form the work liquid flow passage 60. In the illustrated embodiment, the work waterblock 94 is formed as single block or plate with a recessed cavity 96 that forms a portion of the work liquid flow passage 60. In exemplary embodiments, the work liquid flow passage 60 is formed as a single work liquid chamber which extends across a majority of the work thermal conduction plate 70 to enhance surface area. It is understood, however, that other suitable forms of the work waterblock 94 may be provided, including segmented or non-planar forms, which may be configured to form one or more liquid flow passages therein, as would be understood by those having ordinary skill in the art. It is also understood that the term "waterblock" as used herein is utilized as a term of art for a heat transfer component through which liquid flows, and that although the working liquid of the work liquid circuit 48 may be water (e.g., distilled water), that other forms of liquid may be utilized with the work waterblock 94 and other parts of the thermoelectric heat exchanger assembly 56 for providing thermal transfer in the system as may be desired.

Similarly to the ambient waterblock 80, in exemplary embodiments the work waterblock 94 is sealingly engaged against the work thermal conduction plate 70 with a seal 98, gasket or other suitable sealing surface for forming a leak-tight connection that contains the liquid of the work circuit 48 to within the work liquid flow passage 60. As shown in the illustrated embodiment, the work waterblock 94 includes a surface groove 99 in which the seal 98, such as an elastomeric seal (hidden from view), is disposed for encompassing the recessed cavity 96 of the work waterblock 94. The work waterblock 94 may be attached to the work thermal conduction plate 70 with suitable fasteners or other suitable forms of attachment. For example, in the illustrated embodiment, the work waterblock 94 includes fastener receivers 100, such as threaded bores, that receive the fasteners 92 which are received by the fastener receivers 93 of the work thermal conduction plate 70.

Similarly to the ambient waterblock 80, the work waterblock 94 also includes work liquid ports 102, 103 which are in liquid communication with the work liquid flow passage 60 for enabling liquid flow into and out of the work liquid flow passage 60. In the illustrated embodiment, the work liquid ports 102, 103 are disposed on a backside of the work waterblock 94 and are fluidly connected to the work liquid flow passage 60 via corresponding through passages that extend through the work waterblock 94. In exemplary embodiments, the work liquid ports 102, 103 include corresponding work connector portions 104, such as internally threaded bores or locking collars, which are adapted for connection to suitable liquid conduits of the work liquid circuit 48, such as one or more rigid and/or flexible pipes, tubes, or the like. In this manner, the work liquid circuit 48 may supply liquid flow to the work liquid flow passage 60 via one of the work liquid ports (e.g., work inlet port 102), and the work liquid circuit 48 may convey liquid out of the work liquid flow passage 60 via the other work liquid port (e.g., work outlet port 103).

In exemplary embodiments, one or more portions forming the internal work liquid flow passage 60 may include turbulizers along the surface thereof for enhancing turbulent liquid flow characteristics of the liquid within the work liquid flow passage 60, or chamber. For example, in exemplary embodiments, the work thermal conduction plate 70 may have a plurality of turbulizers in the form of micro-fins or other suitable protrusions disposed along the portion of the surface that at least partially forms the work liquid flow passage 60. Alternatively or additionally, the recessed surface 96 of the work waterblock 94 forming at least a portion of work liquid flow passage 60 also may include a plurality of turbulizers for promoting turbulent flow.

As discussed above, in contrast with the ambient side 62 of the thermoelectric heat exchanger assembly 56, one or more parts of the assembly 56 that form at least a portion of the work side 58 of the thermoelectric heat exchanger assembly 56 may be made of low thermal conductivity materials, such that the thermal flux of the work side 58 of the thermoelectric heat exchanger assembly 56 is lower than that of the ambient side 62. In exemplary embodiments, for example, one or more portions of the work waterblock 94 may be formed from low thermal conductivity materials for minimizing the influence of the external environment on the thermal transfer characteristics (e.g., on a mass liquid flow basis) of the work side 58 of the thermoelectric heat exchanger assembly 56. In this manner, the influence of the external environment on the thermal flux characteristics of ambient side 62 of the thermoelectric heat exchanger assembly 56 is configured to be greater than the influence of the external environment on the thermal flux characteristics of the work side 58 of the assembly 56.

The low thermal conductivity materials of the work side 58 may have a thermal conductivity in the range of about 0.001 W/m-K to 10 W/m-K, more particularly in the range from about 0.001 W/m-K to 1 W/m-K, or less. In the illustrated embodiment, for example, the work waterblock 94 is made of a low thermal conductivity polymeric material, such as polyoxymethylene (acetal) (about 0.23 W/m-K) or other similar polymer or plastic, for minimizing such thermal flux with the environment external to and surrounding the work side 58. In addition, as shown in the illustrated embodiment, the work waterblock 94 may be at least partially surrounded by one or more pieces of thermal insulation 76 for further enhancing the thermally insulative properties of the work side 58. In exemplary embodiments, the one or more pieces of thermal insulation 76 may be made of low thermal conductivity materials, such as fiberglass (about 0.04 W/m-K), silicone (about 0.2 W/m-K), or polyurethane (about 0.02 W/m-K), and preferably is made of aerogel material (about 0.003 W/m-K to 0.02 W/m-K), such as Pyrogel® (silica aerogel).

In the illustrated embodiment, a first thermal insulation 76a (e.g., aerogel) is configured as a frame with an opening 106 that surrounds the peripheral edges of the thermoelectric device 65. Also as shown, a second thermal insulation 76b (e.g., aerogel) also is configured as a frame with a larger opening 107 than the opening 106 of the first insulation 76b for surrounding the peripheral edges of at least the work thermal conduction plate 70, and optionally the edges of the work waterblock 94. In addition, a third thermal insulation 76c (e.g., aerogel), which may be a relatively thick piece of insulation compared to the first and second insulations 76a, 76b, may be provided at the backside of the work waterblock 94 for minimizing thermal transfer across the relatively large surface area portion of the work waterblock backside. As shown, the third insulation 76c may include one or more openings 108 (e.g., notches or cutout portions) for providing access to the work liquid ports 102, 103.

In exemplary embodiments, the thermoelectric heat exchanger assembly 56 includes a frame assembly 110 which may be utilized to facilitate securement of the various components of the thermoelectric heat exchanger assembly 56 together and/or to operatively couple the thermoelectric heat exchanger assembly 56 to the grow cabinet 10. The frame assembly 110 also may be configured to form an enclosure that contains portions of the work side 58 of the thermoelectric heat exchanger assembly 56, including the one or more pieces of thermal insulation 76, for further thermally isolating the work side 58.

As shown in the illustrated embodiment, for example, the frame assembly 110 includes a first frame part 112 having a back wall 113 and peripheral sidewalls 114 that form a recess for containing the first, second and third insulations 76a, 76b, 76c. The sidewalls 114 of the first frame part 112 also surround the edges of the thermoelectric device 65, the work thermal conduction plate 70, and the work waterblock 94. The back wall 113 includes at least one opening 115 for facilitating connection of one or more conduits of the work liquid circuit 48 to the work liquid ports 102, 103 at the backside of the work waterblock.

As shown, the first frame part 112 cooperates with a second frame part 116 to enclose the work side 58 of the thermoelectric heat exchanger assembly 56. In exemplary embodiments, the second frame part 116 includes an opening 117 for receiving the thermoelectric device 65 along the edges thereof, such that the ambient side 62 of the thermoelectric heat exchanger assembly 56 may be disposed outside of the enclosure formed by the frame assembly 110, thereby enhancing exposure of the outside environment to the ambient side 62. As shown, the thermoelectric heat exchanger assembly 56, including the frame assembly 110, may be sandwiched and secured together with suitable fasteners, such as nuts 118 and bolts 119. In the illustrated embodiment, each of the ambient waterblock 80, second frame part 116, insulators (76a, 76b, 76c), work waterblock 94, and first frame part 110 include corresponding fastener receivers 120a-g, such as through holes, which are aligned with each other for receiving the corresponding fasteners 118.

Referring back to FIG. 5, the other portions of thermoelectric temperature control system 12 will now be described in further detail. As discussed above, the respective ambient and work liquid flow passages 64, 60 on the respective ambient and work sides 62, 58 of the thermoelectric heat exchanger assembly 56 are fluidly connected to the respective ambient and work liquid circuits 52, 48 via the respective ambient liquid ports 88, 89 and work liquid ports 102, 103 which are fluidly connected to respective ambient liquid conduits 122 and work liquid conduits 124. As shown in the illustrated embodiment, the ambient and work liquid circuits 52, 48 are fluidly isolated from each other on the opposite sides of the thermoelectric device 65 to form a double loop thermoelectric temperature control system 12. Depending on the direction of current flowing through the thermoelectric device 65, either the work side 58 or the ambient side 62 of the thermoelectric heat exchanger assembly 56 will be the hot (warm) or cold (cool) side of the thermoelectric temperature control system 12, as discussed in further detail below. Generally, the liquid flowing on the cold (cool) side of the thermoelectric device 65 is cooled while heat is rejected via the thermoelectric device 65 to the liquid flowing on the opposite hot (warm) side. This hot or cold (warm or cool) liquid flowing through the respective ambient or work liquid circuits 52 or 48 is in thermal communication with their respective environments (e.g., grow chamber or ambient air), thereby enabling controlled and accurate heating or cooling of the grow chamber environment 50.

As shown in the illustrated embodiment, the ambient liquid circuit 52 is a closed-loop circuit in which liquid is circulated via an ambient pump 126. In exemplary embodiments, the ambient liquid circuit 52 includes an ambient liquid manifold 128 having an ambient liquid inlet port 130 for filling the ambient liquid circuit 52 with the ambient-side heat exchange working liquid, which may be water (e.g., distilled water) and/or any other suitable liquid (e.g., propylene glycol) or liquid coolant. The ambient liquid manifold 128 also includes an ambient liquid outlet port 131 (which may be the same as or separate from the ambient inlet port 130) for enabling the ambient working liquid to be drained from the ambient liquid circuit 52. In exemplary embodiments, the ambient liquid manifold 128 may include a valve member 132, such as a flapper valve, which may be utilized for removing air or other gas from the ambient working liquid.

The ambient pump 126 may be any suitable pump for circulating the ambient working liquid through the ambient liquid circuit 52. In the illustrated embodiment, the ambient pump 126 includes an upstream inlet side 134 and a downstream outlet side 135, and conveys the liquid in a specified direction (as shown with flow lines F in FIG. 5, for example). In exemplary embodiments, the ambient pump 126 may be a variable speed pump for changing the velocity of the liquid flow through the ambient liquid circuit 52. As shown, the ambient pump 126 may be operatively coupled to a controller 136 that is configured to change the speed of the ambient pump 126 according to a predetermined program, or in response to one or more input parameters, such as temperature of the ambient working liquid. Alternatively or additionally, the ambient liquid circuit 52 may include one or more pressure or flow control valves (not shown), which may be operatively coupled to the controller 136, for controlling the pressure and/or velocity of the liquid in the ambient circuit 52 and/or for providing backflow control.

In exemplary embodiments, the ambient liquid circuit 52 includes an ambient heat exchanger 138 that is configured to transfer thermal energy (heat) between the ambient working liquid and the ambient environment 54. In the illustrated embodiment, the ambient heat exchanger 138 is located downstream of the outlet 135 of the ambient pump 126 and upstream of the liquid inlet port 88 of the ambient waterblock 80. The ambient heat exchanger 138 may be any suitable heat exchanger for transferring heat with the ambient working liquid. In the illustrated embodiment, for example, the ambient heat exchanger 138 is a plate-fin heat exchanger having a plate 139 with liquid passage(s) fluidly connected to the ambient liquid circuit, and a plurality of fins 140 coupled to the plate 139. One or more ambient fans 142, such as three axial fans, may be located proximal to the fins 140 opposite the plate for drawing air over the fins 140. As shown, in exemplary embodiments the one or more ambient fans 142 may be operatively coupled to the controller 136 for controlling the speed of the fan(s) 142 and thereby the rate of heat transfer with the ambient working liquid.

As shown in the illustrated embodiment, the work liquid circuit 48 also is a closed-loop circuit in which liquid is circulated via a work pump 144. In exemplary embodiments, the work liquid circuit 48 includes a work liquid manifold 146 having a work liquid inlet port 147 for filling the work liquid circuit 48 with the work-side heat exchange working liquid, which may be water (e.g., distilled water) and/or any other suitable liquid (e.g., propylene glycol) or liquid coolant. The work liquid manifold 146 also includes a work liquid outlet port 148 (which may be the same as or separate from the work liquid inlet port 147) for enabling the work liquid circuit 48 to be drained of the work working liquid. In exemplary embodiments, the work liquid manifold 146 may include a valve member 149, such as a flapper valve, which may be utilized for removing air or other gas from the work working liquid.

The work pump 144 may be any suitable pump for circulating the work working liquid through the work liquid circuit 48. In the illustrated embodiment, the work pump 144 includes an upstream inlet side 150 and a downstream outlet side 151, and conveys the liquid in a specified direction (as shown with flow lines F in FIG. 5, for example). In exemplary embodiments, the work pump 144 may be a variable speed pump for changing the velocity of the liquid flow through the work circuit 48. As shown, the work pump 144 may be operatively coupled to the controller 136, which may be configured to change the speed of the work pump 144 according to a predetermined program or in response to one or more input parameters, such as temperature of the work working liquid. Alternatively or additionally, the work liquid circuit 48 may include one or more pressure or flow control valves (not shown), which may be operatively coupled to the controller 136, for controlling the pressure and/or velocity of the liquid in the work circuit 48 and/or for providing backflow control.

In exemplary embodiments, the work liquid circuit 48 includes a work heat exchanger 152 that is configured to transfer thermal energy (heat) between the work working liquid and the grow chamber environment 50. In the illustrated embodiment, the work heat exchanger 152 is located downstream of the liquid outlet port 103 of the work waterblock 94 and upstream of the inlet 150 of the work pump 144. The work heat exchanger 152 may be any suitable heat exchanger for transferring heat with the work working liquid. In the illustrated embodiment, for example, the work heat exchanger 152 is a plate-fin heat exchanger having a plate 154 with liquid passage(s) fluidly connected to the work liquid circuit 48, and a plurality of fins 155 coupled to the plate 154. One or more work fans 38, such as the single centrifugal impeller fan 38 (FIG. 3), may be located proximal to the fins 155 opposite the plate 154 for drawing air over the fins 155. As shown, in exemplary embodiments the one or more work fans 38 may be operatively coupled to the controller 136 for controlling the speed of the fan(s) 38 and thereby the rate of heat transfer with the work working liquid.

As shown in the illustrated embodiment, the controller 136 is operatively coupled to the thermoelectric device 65 via wires 74 for controlling the amount of current and/or polarity of the current flowing through the thermoelectric device 65, which controls the direction and degree of thermal transfer across the thermoelectric device 65. In exemplary embodiments, a pulse width modulation (PWM) controlled DC current is provided to the thermoelectric device 65. In the illustrated embodiment, for example, the thermoelectric temperature control system 12 utilizes a 24 volt DC power source, in which a 24 volt to 12 volt, 120 watt DC-DC converter may be used to power the thermoelectric device 65 via a high-amp H-bridge circuit. The wattage may be determined by the thermoelectric device 65 (e.g., Peltier chip) being utilized and the size of an expansion circuit, if applicable.

As discussed above, the ambient pump 126 and the work pump 144 also may be operatively coupled to the controller 136 for controlling the speed of the liquid flowing through the respective ambient and work liquid circuits 52, 48, thereby affecting the rate of heat transfer through each circuit. In the illustrated embodiment, the work pump 144 and the ambient pump 126 may each be 2 GPM pumps, which may be operated on the 24 volt DC power source with or without a voltage converter. In exemplary embodiments, the work pump 144 may be operated a lower speed than the ambient pump 126 for enhancing efficiency of the thermoelectric device 65.

Also as discussed above, the ambient fan(s) 142 and the work fan(s) 38 blowing over the respective ambient and work heat exchangers 138, 152 also may be operatively coupled to the controller 136 for controlling the speed of the fans 142, 38 and thereby the rate of heat transfer. In the illustrated embodiment, the ambient fan(s) 142 include at least three 50 CFM or greater fans for enhancing the airflow and rate of heat transfer with the ambient side 62 of the thermoelectric heat exchanger assembly 56. As noted above, the work fan(s) 38 may include a single centrifugal impeller fan or blower, which may have a lower flow rate than the axial fans 142 but provides a steadier flow of air. The ambient fan(s) 142 and the work fan(s) 38 may each operate on the 24 volt DC power source with or without a voltage converter.

In the illustrated embodiment, the controller 136 also is operatively coupled to at least one ambient temperature sensor 156, such as a thermistor or the like, that is configured to sense the temperature of the liquid in the ambient liquid circuit 52 and communicate a temperature signal corresponding to the sensed temperature to the controller 136. The controller 136 also is operatively coupled to at least one work temperature sensor 158, such as a thermistor or the like, that is configured to sense the temperature of the liquid in the work liquid circuit 48 and communicate a temperature signal corresponding to the sensed temperature to the controller 136. Furthermore, the controller 136 also may be operatively coupled to a grow chamber temperature sensor 160 that is configured to sense the temperature in the grow chamber environment 50 and communicate a temperature signal corresponding to the sensed temperature to the controller 136. In addition, the controller 136 also may be operatively coupled to an ambient environment temperature sensor 162 that is configured to sense the temperature of the external ambient environment 54, such as proximal the ambient waterblock 80 and/or ambient heat exchanger 138, and communicate a temperature signal corresponding to the sensed temperature to the controller 136. The respective temperature signals received by the controller 136 from the respective temperature sensors (e.g., 156, 158, 160, 162) may be utilized as input parameters that are read by the controller 136 for controlling the temperature of the ambient and work liquids, and/or the grow chamber, such as via PID control loop logic. In exemplary embodiments, the ambient and work liquid circuits 52, 48 also may each include at least one liquid flow sensor (e.g., ambient flow sensor 164 and work flow sensor 166) for measuring the velocity of liquid flow through each liquid circuit 52, 48, as discussed in further detail below.

In exemplary embodiments, the controller 136 may include input/output ports for connection to additional controllers, sensor or the like. For example, one input/output port may be utilized to allow an external control board to be connected to collect data from sensors for use outside the system. Another input/output port may be utilized to connected to a temperature sensor, such as a thermistor, to allow the unit to run independently from an outside control interface. Still another input/output port may be utilized to allow an external controller to adjust the setpoints of the various components (e.g., thermoelectric device 65; pumps 144, 126; fans 142, 38, etc.) and to deliver temperature information to the controller 136. The temperature setpoints of the various environments (e.g., grow chamber, work liquid, ambient liquid, etc.) may be predetermined and programmed during construction of the grow cabinet 10, or may be varied with the controller 136, or controlled by an external controller.

In exemplary embodiments, the thermoelectric temperature control system 12 has a theoretical maximum temperature differential of 70° C. (158° F.) between the grow chamber temperature and ambient temperature when used in a 27° C. (80° F.) ambient environment with a maximum transfer rate of 55.6 watts (189.7 BTU). As discussed in further detail below with exemplary reference to FIG. 15, the thermoelectric temperature control system 12 may be expanded with additional thermoelectric temperature control systems by connecting additional thermoelectric heat exchanger assemblies and corresponding additional work and ambient liquid circuits (and associated components) to the existing work and ambient liquid circuits. Additional 12 volt DC power modules also may be added to the expanded system. A single controller (e.g., 136) may be configured to control all of the thermoelectric temperature control systems together to enhance the heat transfer capabilities of the overall system.

Figure 8:
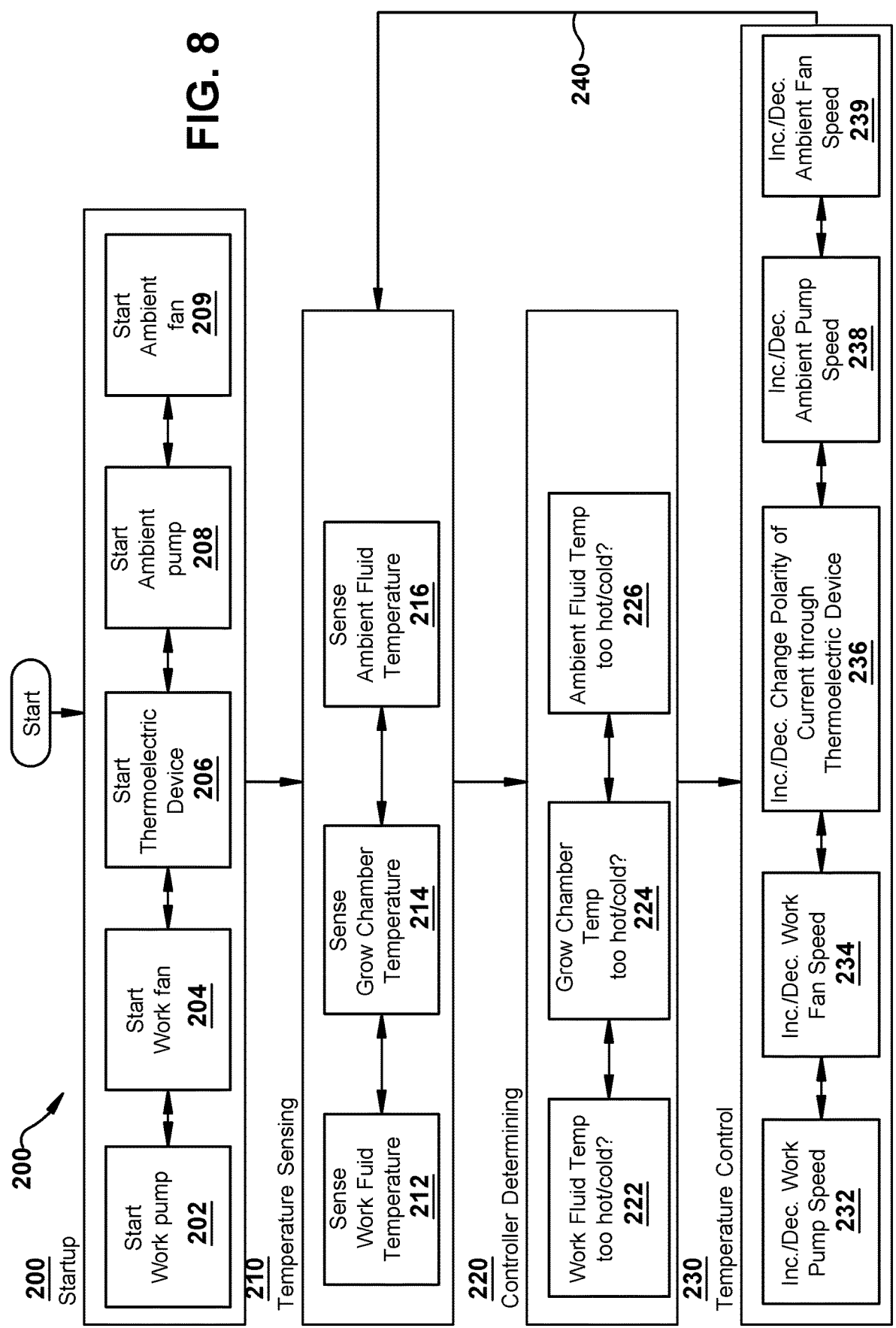
FIG. 8 is a flow diagram showing an exemplary operation of the thermoelectric temperature control system.

FIG. 8 shows an exemplary flow diagram 200 of a general control logic for the controller 136 controlling the exemplary thermoelectric temperature control system 12. As shown, the process may begin with a startup step 200, in which the controller 136 is configured to power-on each of the work pump 144 (step 202), work fan(s) 38 (step 204), thermoelectric device 65 (step 206), ambient pump 126 (step 208), and ambient fan(s) 142 (step 209). After this step 200, the controller 136 may verify that liquid is flowing through the ambient and work liquid circuits 52, 48 via the flow sensors 164, 166. The controller 136 also may verify that the ambient and work fans 142, 38 are running, such as via a potential with tachometer.

At step 210, the temperature sensors (e.g., 156, 158, 160, 162) sense the corresponding temperatures of their respective environments and communicate the respective temperature signals corresponding to those temperatures to the controller 136. For example, the controller 136 checks the temperature of the work liquid via the temperature signal from the work liquid temperature sensor 158 (step 212). The controller 136 also checks the temperature of the ambient liquid via the temperature signal from the ambient liquid temperature sensor 156 (step 214). The controller 136 also checks the temperature of the grow chamber environment 50 via the temperature signal from the grow chamber temperature sensor 160 (step 216). Optionally, the controller 136 may check the temperature of the ambient environment 54 via the temperature signal from the ambient air temperature sensor 162.

At step 220, the controller 136 determines whether the temperatures of the respective environments are too hot (warm) or too cold (cool) by comparing the received temperature signals from the temperature sensors (e.g., 156, 158, 160, 162) relative to respective setpoint temperatures. The setpoint temperatures of the respective environments may be preloaded into the program of the controller 136, may be modified by an external controller or other input, may be varied according to a range of temperatures around the setpoint temperature, or may be modified in any other suitable way well-known to those having ordinary skill in the art.

For example, at step 222, the controller 136 may determine whether the work working liquid temperature is too hot (warm) or cold (cool) by comparing the temperature signal received from the work temperature sensor 158 to a work liquid setpoint temperature. At step 224, the controller 136 may determine whether the grow chamber environment temperature is too hot (warm) or cold (cool) by comparing the temperature signal received from the grow chamber temperature sensor 160 to a grow chamber liquid setpoint temperature. In addition, at step 226, the controller 136 may determine whether the ambient working liquid temperature is too hot (warm) or cold (cool) by comparing the temperature signal received from the ambient temperature sensor 156 to an ambient liquid setpoint temperature.

At step 230, based upon the determination that one or more of the sensed temperatures are above or below the corresponding setpoint temperatures, the controller 136 is configured to control one or more components of the thermoelectric temperature control system to adjust those temperatures closer to their setpoint temperatures.

For example, based upon the determination that the sensed temperature of the work liquid circuit 48 is above or below the work liquid setpoint temperature (step 222), in step 230 the controller 136 may increase or decrease the speed of the work pump 144 (step 232), may increase or decrease the speed of the work fan(s) 38 (step 234), may increase or decrease the current flowing through the thermoelectric device 65 (step 236), and/or may reverse polarity of the current flowing through the thermoelectric device 65 (step 236).

Similarly, based upon the determination that the sensed temperature of the ambient liquid circuit 52 is above or below the ambient liquid setpoint temperature (step 226), in step 230 the controller 136 may increase or decrease the speed of the ambient pump 126 (step 238), may increase or decrease the speed of the ambient fan(s) 142 (step 239), may increase or decrease the current flowing through the thermoelectric device 65 (step 236), and/or may reverse polarity of the current flowing through the thermoelectric device 65 (step 236).

Likewise, based upon the determination that the sensed temperature of the grow chamber environment 50 is above or below the grow chamber setpoint temperature, in step 230 the controller 136 may increase or decrease the speed of the work and/or ambient pumps 144, 126 (steps 232, 238), may increase or decrease the speed of the work and/or ambient fans 38, 142 (steps 234, 239), may increase or decrease the current flowing through the thermoelectric device 65 (step 236), and/or may reverse polarity of the current flowing through the thermoelectric device 65 (step 236). It is understood that the foregoing logic is merely exemplary, and that the controller 136 may combine any of the foregoing parameters to achieve the desired result.

In exemplary embodiments, if the controller 136 determines that the grow chamber temperature is too hot (warm) (e.g., above the grow chamber setpoint temperature, or a range thereabout) and that the grow chamber needs to be cooled, then a PWM controlled standard polarity DC current may be applied to the thermoelectric device 65 such that the ambient side 68 of the thermoelectric device 65 is the hot (warm) side and the work side 67 of the thermoelectric device 65 is the cold (cool) side. In this manner, the thermoelectric device 65 draws heat from the liquid flowing through the work liquid flow passage 60 of the thermoelectric heat exchanger assembly 56, making the work working liquid flowing downstream to the work heat exchanger 152 cooler. The work heat exchanger 152 is in thermal communication with the grow chamber environment 50, such as via the airflow caused by the work fan(s) 38 flowing across the work heat exchanger 152 and into the chamber, thereby cooling the grow chamber 16. During this process, the heat flowing across the thermoelectric device 65 is transferred into the liquid flowing through the ambient liquid flow passage 64, which is conveyed downstream to the ambient heat exchanger 138. The ambient fan(s) 142 draw heat out of the ambient liquid circuit 52 via the ambient heat exchanger 138 and into the ambient environment 54, thereby cooling the ambient circuit liquid for further heat transfer from the thermoelectric device 65.

As discussed above, the work side 58 of the thermoelectric heat exchanger assembly 56 is configured to have a lower thermal flux (e.g., more insulative) than the ambient side 62 of the thermoelectric heat exchanger assembly 56, such that the work side 58 minimizes heat gain into the work liquid from the external environment (i.e., less impact from the environment surrounding the work waterblock, for example), whereas the ambient side 62 maximizes heat loss to the ambient environment (i.e., more impact from the external environment). This minimizes thermal load on the work side 58 during cooling of the grow chamber 16 to achieve a maximum differential in liquid temperatures on the opposite sides of the thermoelectric device 65. This enables the thermoelectric device 65 to utilize its maximum potential (or near maximum potential) in transferring heat between the respective liquid circuits 48, 52, thereby enhancing accuracy in the temperature control of the system 12.

In such a chamber cooling scenario, the controller 136 may be configured to maintain a temperature difference between the temperature of the liquid in the work liquid circuit 48 and the temperature of the grow chamber to maintain a stable grow chamber temperature. The exhaust fan(s) 45 of the grow cabinet 10 also may be controlled by the controller 136 to control the amount of airflow and temperature escaping from the grow chamber 16. The controller 136 may use a PID loop (e.g. step 240 in FIG. 8) to continuously monitor and control the work liquid temperature and/or the grow chamber temperature. If the liquid temperature falls below a programmed threshold temperature (e.g., 34° F. for pure water), then the controller 136 may signal a warning that the liquid may freeze.

In exemplary embodiments, if the controller 136 determines that the grow chamber temperature is too cold (cool) (e.g., below the grow chamber setpoint temperature, or a range thereabout) and that the grow chamber 16 needs to be warmed, then a PWM controlled reverse polarity DC current may be applied to the thermoelectric device 65 such that the ambient side 68 of the thermoelectric device 65 is the cold (cool) side and the work side 67 of the thermoelectric device 65 is the hot (warm) side. In this manner, the thermoelectric device 65 draws heat from the liquid flowing through the ambient liquid flow passage 64 of the thermoelectric heat exchanger assembly 56, making the ambient working liquid flowing downstream to the ambient heat exchanger 138 cooler. The ambient heat exchanger 138 is in thermal communication with the ambient environment 54, such as via the airflow caused by the ambient fan(s) 142 flowing across the ambient heat exchanger 138, thereby keeping the ambient liquid at or near ambient temperature, or warm. During this process, the heat flowing across the thermoelectric device 65 is transferred into the liquid flowing through the work liquid flow passage 60, which is conveyed downstream to the work heat exchanger 152. The work heat exchanger 152 is in thermal communication with the grow chamber environment 50, such as via the airflow caused by the work fan(s) 38 flowing across the work heat exchanger 152 and into the grow chamber 16, thereby warming the grow chamber 16.

Again, because the work side 58 of the thermoelectric heat exchanger assembly 56 is configured to have a lower thermal flux (e.g., more insulative) than the ambient side 62 of the thermoelectric heat exchanger assembly 56, the work side 58 minimizes heat loss from the work working liquid into its external environment, and the ambient side 62 maximizes heat gain from its external (ambient) environment. In this manner, when heating, the thermal load on the ambient side 62 is maximized to load the work liquid circuit 48 with as much thermal energy as possible or desirable, which enhances the temperature control of the thermoelectric temperature control system 12.

In such a chamber warming scenario, the controller 136 may be configured to maintain a temperature difference between the temperature of the liquid in the work liquid circuit 48 and the temperature of the grow chamber 16 to maintain a stable chamber temperature. The exhaust fan(s) 45 of the grow cabinet 10 also may be controlled by the controller 136 to control the amount of airflow and temperature escaping from the grow chamber 16. The controller 136 may use a PID loop (e.g., step 240) to continuously monitor and control the work liquid temperature and/or the grow chamber temperature. If the liquid temperature exceeds a programmed threshold temperature (e.g., 200° F. for pure water), then the controller may signal a warning that the components may fail.

In exemplary embodiments, if the controller 136 determines that the liquid in the work liquid circuit 48 is too hot (warm) or cold (cool), then it may be assumed the cause is a high thermal load on the work side 67 of the thermoelectric device 65 or that the measured grow chamber temperature is significantly different from the grow chamber setpoint temperature. In this scenario, the controller 136 may be configured to provide less power to the thermoelectric device 65. If the setpoint of the grow chamber temperature is not reached within a predetermined period of time, then the controller 136 may signal a warning, such as an audible or visual warning.

In exemplary embodiments, if the controller 136 determines that the liquid in the ambient liquid circuit 52 is too hot (warm), then it may be assumed that the cause is a low liquid level in the ambient liquid circuit 52. In such a scenario, the controller 136 may be configured to shut down the thermoelectric temperature control system 12 and signal a warning.

As discussed above, the controller 136 also may monitor liquid flow rates through the respective ambient and work liquid circuits 52, 48 such as via the respective ambient and work flow sensors 164, 166. If the controller 136 determines that liquid flow has significantly decreased or stopped, then it may be assumed that the cause is low liquid level in the work and/or ambient liquid circuits 42, 48. In such a scenario, the controller 136 may be configured to shut down the thermoelectric temperature control system 12 and signal a warning.

The present inventor conducts various experiments and constructs prototype(s) to arrive at the foregoing configuration of the thermoelectric temperature control system 12.

Experiment 1

A solid aluminum heat sink cooled by an axial fan is connected to the hot side of the Peltier chip. A temperature of −12° F. is measured on the cold side of the Peltier chip, but unable to connect the chip to a working environment. The ambient environment temperature is 70-75° F.

Experiment 2

Liquid is used on the hot side of the Peltier chip via a 3D-printed waterblock, aluminum heat spreader, centrifugal water pump, axial fan and a heat exchanger. A temperature of −14° F. is measured on the cold side, but unable to connect the chip to a working environment. The ambient environment temperature is 70-75° F.

Experiment 3

Liquid is used on both sides of the chip using two plastic 3D-printed waterblocks, centrifugal pumps, and aluminum heat spreaders on the opposing sides of the Peltier chip. The hot side of the Peltier chip also includes a heat exchanger and an axial fan. The liquid on the cold side is measured to be −15° F. with no load (not connected to working environment). The ambient environment temperature is 70-75° F.

Experiment 4

Liquid is used on both sides of the Peltier chip with no insulation. A heat exchanger and axial fan are added to the cold circuit to try and cool a 1.5 ft² cavity. The temperature of the liquid in the cold circuit is measured at approximately 30-40° F. and the cavity temperature was lowered roughly 5° F. The ambient environment temperature is 70-75° F.

Experiment 5

Insulation is added to the cavity and liquid lines with little to no effect. The ambient environment temperature is 70-75° F.

Experiment 6

Insulation is added to the waterblock, heat exchanger frame, and reservoir. Flow control valves are added to slow the working fluid flow rate. A temperature of −15° F. is measured in the liquid in the cold circuit, and the cavity is able to maintain constant 15° F. to 20° F. below ambient temperature. The ambient environment temperature is 70-75° F.

Experiment 7

An aluminum waterblock and a plastic waterblock are used, fully insulated in accordance with the foregoing configuration of the thermoelectric heat exchanger assembly 56, and a temperature of −36° F. is reached in the working fluid under no thermal load and an increase of 5° F. to 10° F. on the ambient side of the system. The ambient environment temperature is 70-75° F.

Prototype 1

A 200HH countertop cabinet is used in accordance with the foregoing configuration of the thermoelectric temperature control system 12. The setup is able to maintain 20° F. below ambient with a temperature swing of approximately 0.5° F. The 200 HH is approximately a 1.3 cubic foot internal chamber with 1-inch fiberglass insulation on all four sides and designed for hot holding. The base and side walls of the interior are made using aluminum to transfer heat more easily into the holding compartment and the top, back, and door are made from stainless steel to more insulate the cabinet compared to the aluminum. The outer skin is stainless steel and there is a 1.5 inch electrical compartment on the top of the unit.

Prototype 2

A prophetic example in accordance with the thermoelectric temperature control system 12, in which copper and acetal waterblocks are used for the grow box.

Figure 4:
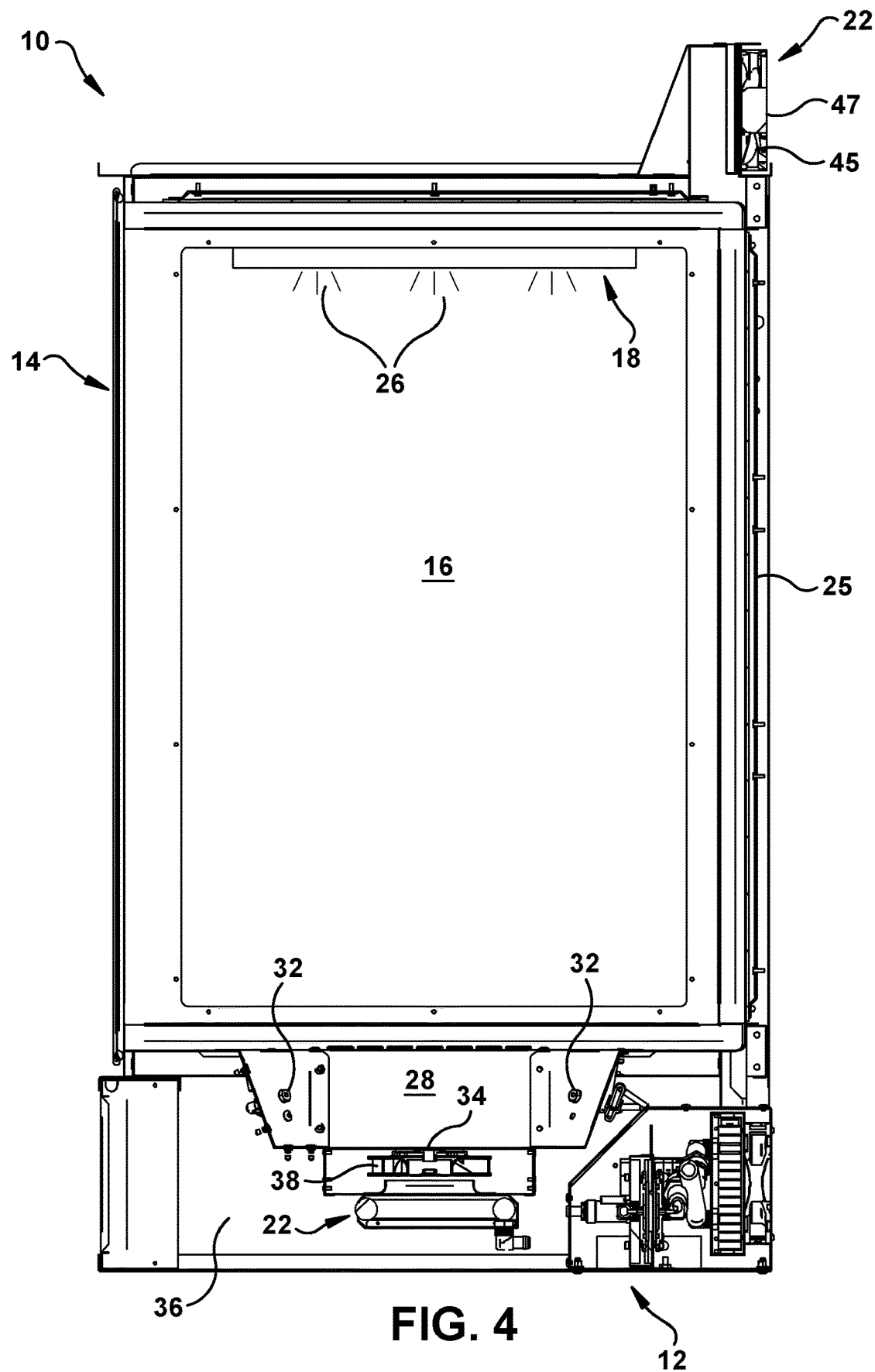
FIG. 4 is a cross-sectional side view of the grow cabinet.
Figure 9:
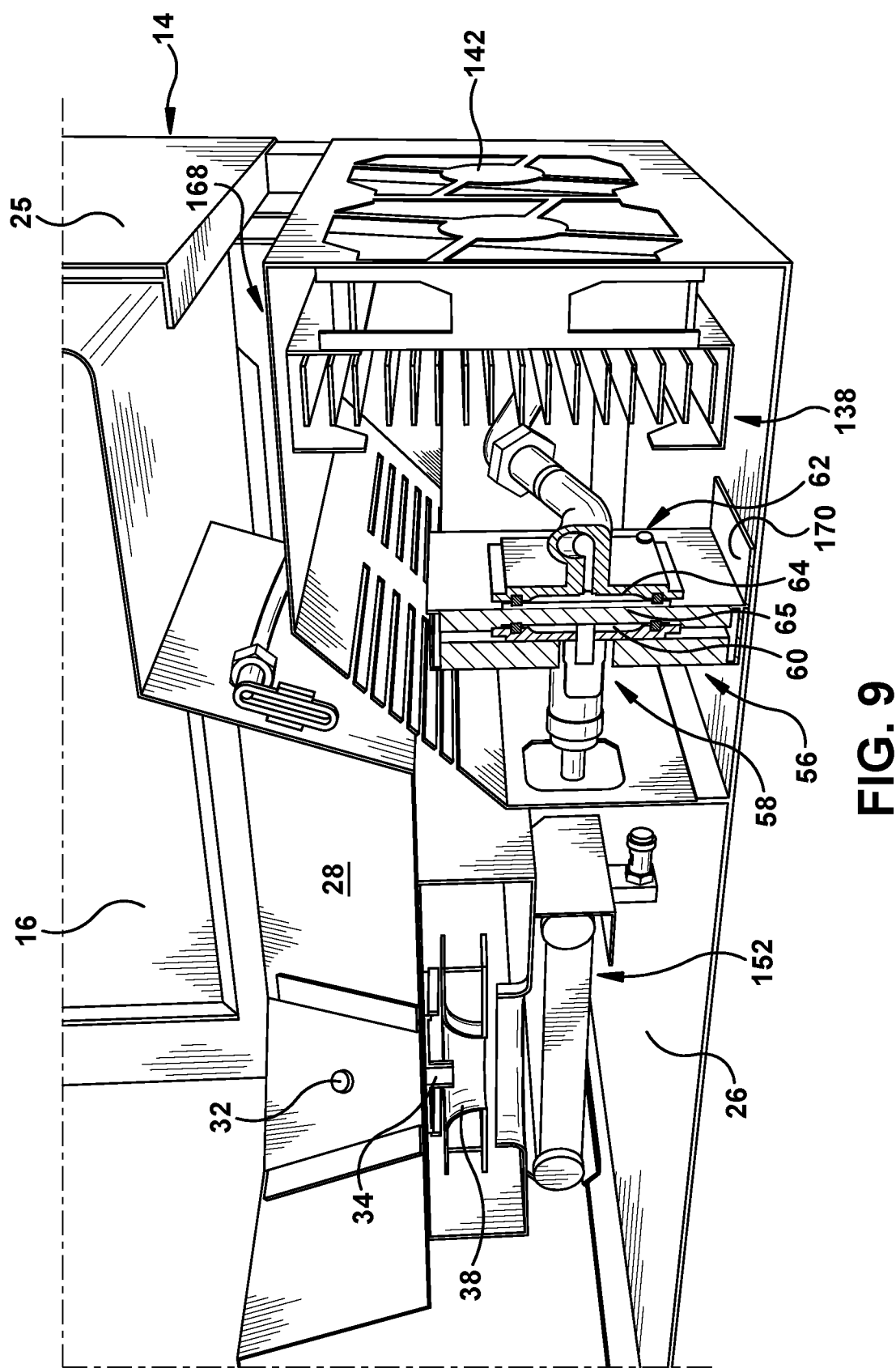
FIG. 9 is an enlarged perspective side view of a lower portion of the grow cabinet showing the location of the thermoelectric temperature control system.
Figure 10:
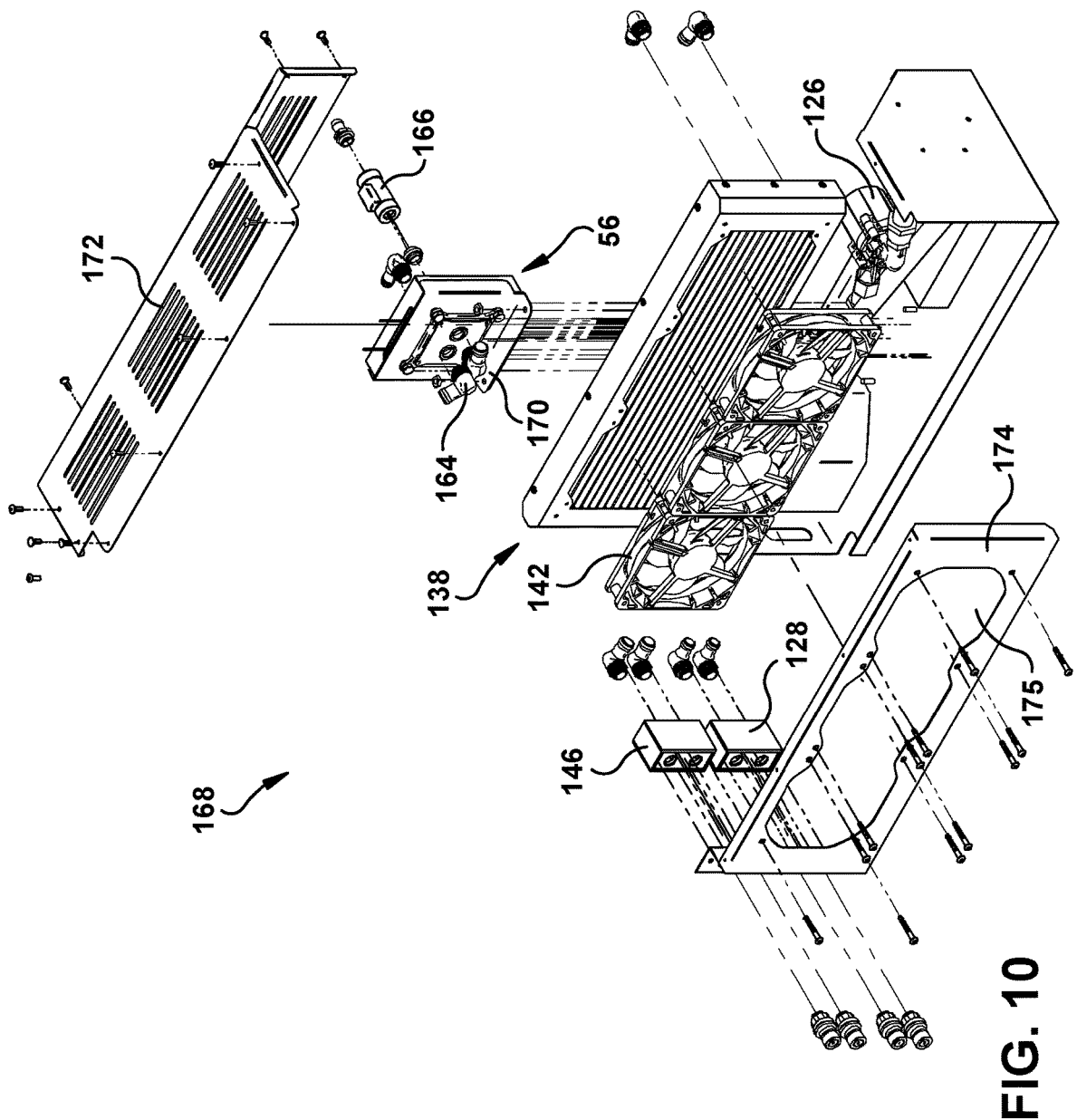
FIG. 10 is an exploded perspective view of an exemplary modular box that contains portions of the thermoelectric temperature control system.
Figure 12:
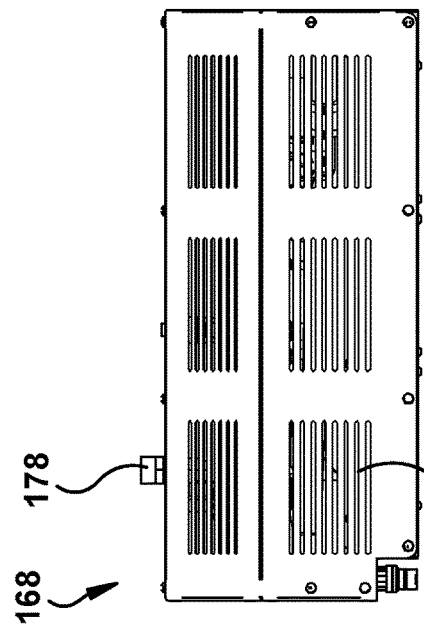
FIG. 12 is a top view of the modular box.
Figure 11:
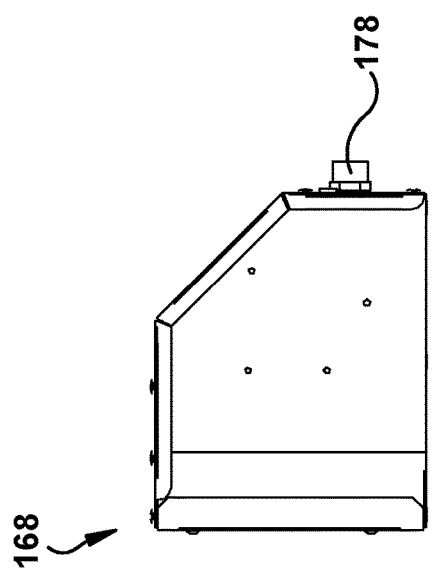
FIG. 11 is a side view of the modular box.
Figure 14:
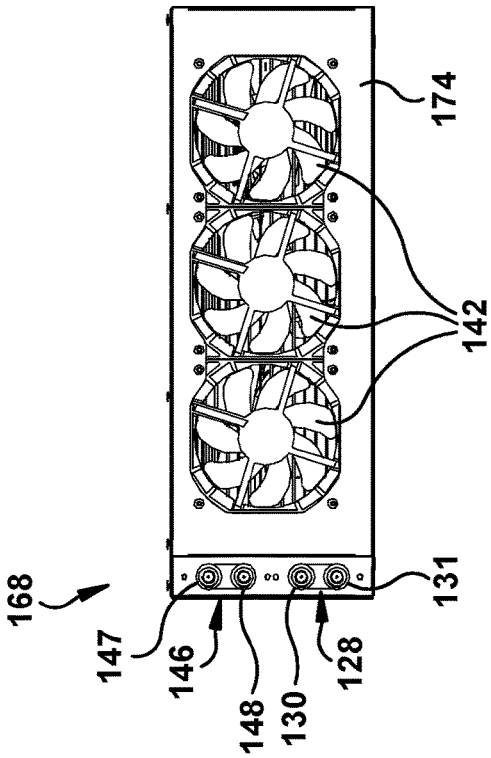
FIG. 14 is a rear view of the modular box.
Figure 13:
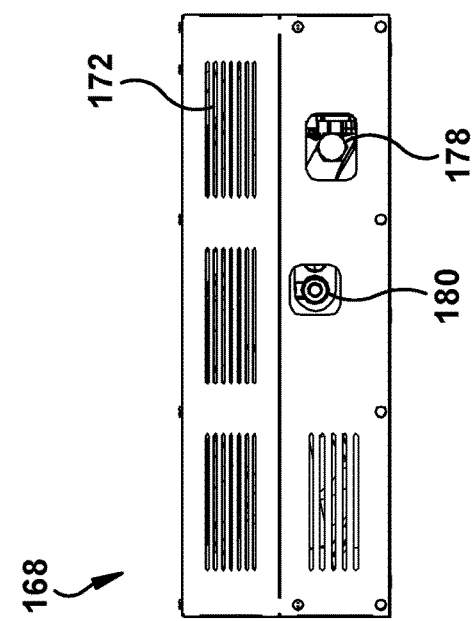
FIG. 13 is a front view of the modular box.

Turning now to FIG. 9, and also back to FIGS. 3 and 4, the thermoelectric heat exchanger assembly 56 is shown disposed in the lower cavity 26 below the housing 14 of the grow cabinet 10. As discussed above, the lower cavity 26 has a generally open air configuration, and thus promotes exposure of the ambient environment to the ambient side 62 of the thermoelectric heat exchanger assembly 56. In exemplary embodiments, the thermoelectric heat exchanger assembly 56 is disposed within a modular box 168, or case, that may be pre-assembled and facilitates ease of installation of the thermoelectric heat exchanger assembly 56 into the lower cavity 26 of the grow cabinet 10. As shown, the modular box 168 is situated in the lower cavity 26 such that the ambient fan(s) 142 blow air outwardly outside of the grow cabinet 10.

FIGS. 10-14 show the modular box 168 containing the thermoelectric heat exchanger assembly 56 in further detail. As shown, the modular box 168 may be made of sheet metal, such as aluminum or steel, and encloses the space that contains the thermoelectric heat exchanger assembly 56. In the illustrated embodiment, the modular box 168 contains the thermoelectric heat exchanger assembly 56, including the frame assembly 110, in which a bracket 170 of the second frame part 116 is fixed to a base of the box 168 so that the thermoelectric device 65 stands vertically upright.

As shown, the modular box 168 also includes the entire ambient liquid circuit 52 of the thermoelectric temperature control system 12, including the ambient liquid conduits 122, ambient pump 126, ambient heat exchanger 138 and ambient fans 142. Also included in the modular box 168 are the ambient liquid flow sensor 164 (which may have the ambient temperature sensor 156). As shown, the casing of the modular box 168 includes grating 172 for allowing ingress of ambient airflow into the box 168. In addition, a frame portion 174 of the box 168 includes at least one opening 175 for enabling the ambient fans 142 to blow air out of the box 168.

In the illustrated embodiment, one or more liquid connections of the ambient liquid circuit 52 are pre-connected together in the modular box 168 for enhancing the modularity and assembly of the thermoelectric heat exchanger assembly 56 into the growing cabinet 10. As shown, the ambient liquid manifold 128 also may be included in the box 168 and preconnected into the ambient liquid circuit 52. In the illustrated embodiment, when the modular box 128 is installed in the lower cavity 26, the liquid inlet and outlet ports 130, 131 of the ambient liquid manifold 128 are outwardly addressable for allowing ease of filling or draining of the liquid from the ambient liquid circuit 52.

The modular box 168 may further contain portions of the work liquid circuit 48 for facilitating assembly of the thermoelectric heat exchanger assembly 56. In the illustrated embodiment, for example, the modular box 168 includes a first (inlet) connector 178 of the work liquid conduit 124 that is pre-fluidly-connected to the work inlet port 102 of the work waterblock 94, and includes a second (outlet) connector 180 of the work liquid conduit 124 that is pre-fluidly-connected to the work outlet port 103 of the work waterblock 94. One or more of the liquid connectors 178, 180 may be disposed outwardly of the box 168 for fluidly connecting the work liquid conduits 124 to and from the work heat exchanger 152, which may be fixed below the work fan 38 in the lower cavity 26 (as shown in FIG. 5, for example).

In exemplary embodiments, the work pump 144 also may be included in the modular box 168 and may be pre-fluidly-connected within the box. Optionally, the work flow sensor 166 (which may include the work temperature sensor 158) also may be included in the modular box 168 and may be pre-fluidly-connected. As shown, the work liquid manifold 146 also may be included in the box 168 and may be pre-fluidly-connected. In the illustrated embodiment, the work liquid manifold 146 is also situated such that the liquid inlet and outlet ports 147, 148 of the work liquid manifold 146 are outwardly addressable for allowing ease of filling or draining of the liquid from the work liquid circuit 48.

Figure 15:
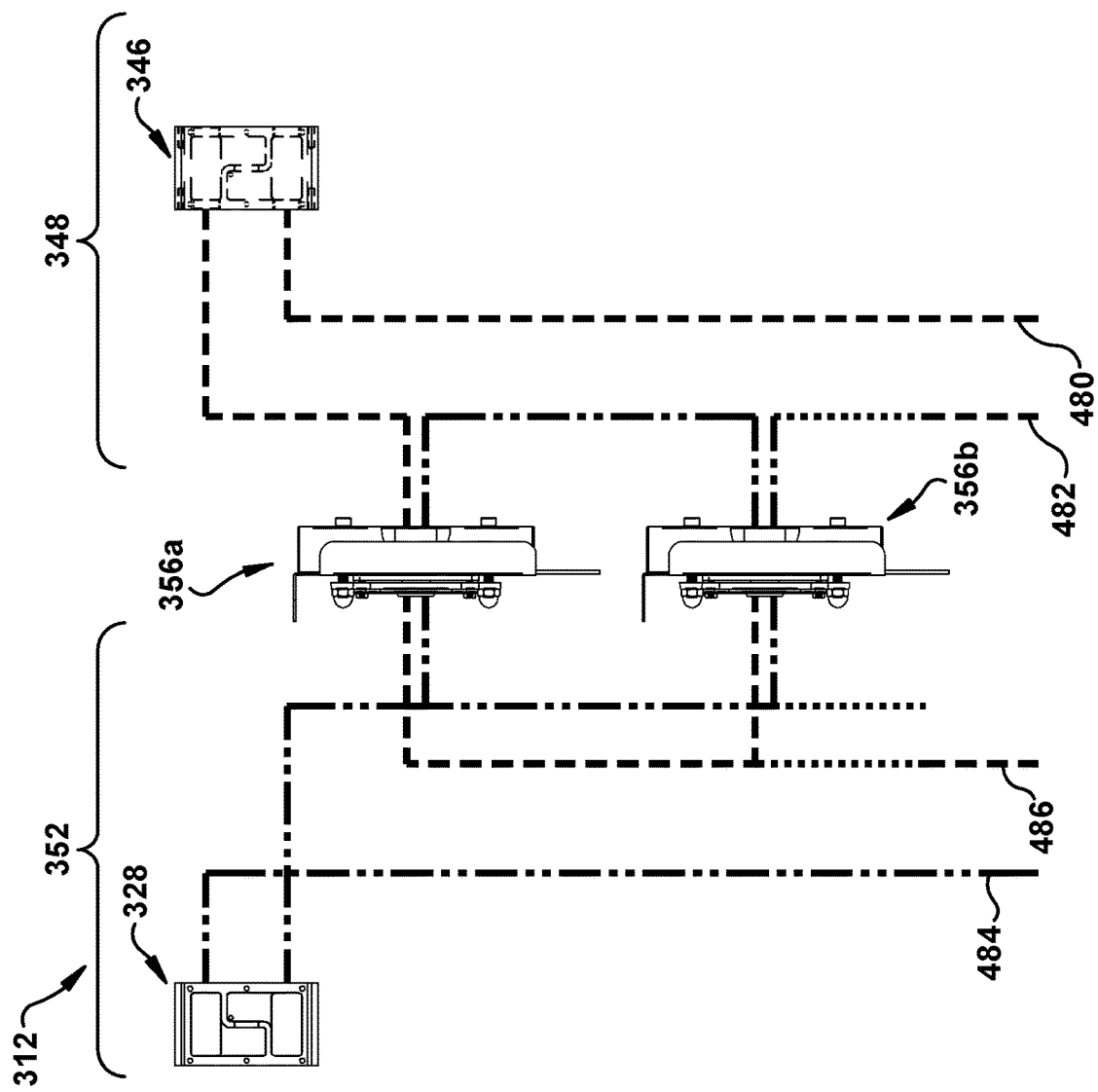
FIG. 15 is a schematic diagram of an exemplary expansion circuit for connection to the thermoelectric temperature control system in FIG. 5.

Referring to FIG. 15, an exemplary expansion circuit 312 for the exemplary thermoelectric temperature control system is shown. The expansion circuit 312 is substantially similar to the above-referenced thermoelectric temperature control system 12, and consequently the same reference numerals but indexed by 300are used to denote structures corresponding to similar structures in the expansion circuit 312 and the thermoelectric temperature control system 12. In addition, the foregoing description of the thermoelectric temperature control system 12 is equally applicable to the expansion circuit 312, except as noted below. Moreover, it is understood that aspects of the expansion circuit 312 and thermoelectric temperature control system 12 (and circuit thereof) may be substituted for one another or used in conjunction with one another where applicable.

As shown, the expansion circuit 312 includes two additional thermoelectric heat exchanger assemblies 356a, 356b fluidly connected with the exemplary thermoelectric temperature control system 12. As shown, the expansion circuit 312 includes an expanded ambient liquid circuit 352 and an expanded work liquid circuit 348, which may be constructed similarly to the respective ambient and work liquid circuits 52, 48. In the illustrated embodiment, the thermoelectric heat exchanger assemblies 356a, 356b are identical to the thermoelectric heat exchanger assembly 56, although it is understood that the additional assemblies 356a, 356b could be different depending on the system requirements, as would be understood by those having ordinary skill in the art. It is also understood that fewer or more such thermoelectric heat exchanger assemblies 356a, 356b could be utilized in the expansion circuit 312.

In exemplary embodiments, the expanded ambient and work liquid circuits 352, 348 may be fluidly connected to respective ambient and work liquid circuits 52, 48 of the thermoelectric temperature control system 12 via the respective ambient and work liquid manifolds 128, 146. As shown, the expanded work liquid circuit 348 flows through each of the additional thermoelectric heat exchanger assemblies 356a, 356b in a similar manner described above for the thermoelectric heat exchanger assembly 56, and forms a closed-loop circuit with the work liquid circuit 48 of the thermoelectric temperature control system 12.

As shown, the expansion circuit 312 connects into the fill ports 128, 146 of the system 12 and then becomes the main fill ports of the system. The expansion inputs 480, 484 into the system 312 from the system 12 connects to the ports 130, 148 of the respective sides of the system 12. The expansion outputs 482, 486 from the system 312 to the system 12 connects to the ports 131, 147 of the respective sides of the system 12.

The liquid on the work side 348 of the system 312 is run in series to maximize the temperature change in the working liquid. As the liquid is sent from one work waterblock (e.g., in 356a) to the next work waterblock (e.g., in 356b) the temperature of the liquid can be changed further, although the minimum temperature achievable may be determined by the component minimums (e.g., a work waterblock made of acetal may be less than −40° F., and silicone may be −70° F.) and component maximums (e.g., a work waterblock made acetal may be 200° F., silicone 450° F., heat exchanger 302° F., Peltier Chip 200° F.) and fluid freezing point (32° F. for water or −40° F. for propylene glycol). In other words, generally the lowest temperature achievable by the system may be dictated by the component with the highest minimum temperature in the system. If distilled water is used, the minimum temperature should be just above the freezing point (32° F.) whereas, if propylene glycol is used the lowest point should be warmer than the failure point of the acetal waterblock (e.g., −40° F.). The highest operating temperature achievable should be the lowest maximum temperature in the system. Water boils at approximately 212° F., however, the acetal waterblock can begin to deform if exposed for long periods of time at temperatures above 200° F. Thus, the maximum temperature of the system may be the maximum operating temperature of the acetal waterblock as thermal expansion and phase shifting from fluid to gas could cause the plastic waterblock to deform and no longer provide a sealing surface, or potentially rupture.

The ambient side 352 is run in parallel in order to minimize the temperature change from one Peltier chip to the next since the majority of the energy transfer to dissipate any changes is accomplished at the heat exchanger 138. This way the thermal energy is more evenly distributed to maintain a temperature closer to ambient even though more energy is being pumped into the ambient liquid circuit.

In exemplary embodiments, the expansion circuit 312 does not include additional heat exchangers and pumps, and instead relies on the respective ambient and work heat exchangers 138, 152, and the respective ambient and work pumps 126, 144 via the closed-loop architecture. The expansion circuit 312 also may utilize the controller 136, temperature sensors 156, 158, flow sensors 164, 166, and power source (not shown) of the thermoelectric temperature control system 12. With the exemplary heat exchangers 138, 152, pumps 126, 144 and power source of the thermoelectric temperature control system 12 described above, it is estimated that up to eight additional thermoelectric heat exchanger assemblies 356 could be added to the exemplary expansion circuit 312. As shown, each of the expanded ambient and work liquid circuits 352, 348 includes corresponding ambient and work liquid manifolds 328, 346, which may be utilized for connecting additional expansion circuits, or which may be utilized for filling, draining, and degassing the respective expanded ambient and work liquid circuits 352, 348, as discussed above.

It is understood that the thermoelectric devices of the respective thermoelectric heat exchanger assemblies 356a, 356b provide less efficiency as they reach their maximum differential. As the liquid gets hotter or colder on the work side 348, less energy is able to be transferred. The maximum total energy transferred can change the liquid temperature in the respective liquid circuits to the maximum differential of the Peltier chip being used. Basically the BTUs transferred are greatest on startup, but decline as the system reaches maximum differential of the Peltier device. In the grow box chamber 16, the maximum thermal load may be the maximum transferrable by the work heat exchanger 152 at the CFM rating of the intake fan (e.g., 250-350 watts) plus the losses during transit of the liquid.

A temperature controlled cabinet such as a grow cabinet having an exemplary thermoelectric temperature control system has been described herein, in which the system includes a work liquid circuit in thermal communication with an environment inside of the grow chamber, an ambient liquid circuit in thermal communication with an ambient environment outside of the chamber, and a thermoelectric heat exchanger assembly interposed between the work liquid circuit and the ambient liquid circuit for transferring heat between the liquid circuits. The thermoelectric heat exchanger assembly has a work side fluidly connected to, and in thermal communication with, the work liquid circuit; an ambient side fluidly connected to, and in thermal communication with, the ambient liquid circuit; and a thermoelectric device interposed between the work side and the ambient side for transferring heat between the ambient and work liquid circuits. The work side of the thermoelectric heat exchanger assembly is configured to have a greater overall thermal flux with its external environment than the ambient side of the assembly, which enhances temperature control of the system. In exemplary embodiments, one or more portions of the ambient side may be made of high thermal conductivity material(s), and one or more portions of the work side may be made of low thermal conductivity material(s). Alternatively or additionally, the work side may include thermal insulation to further thermally insulate the work side relative to the ambient side.

In exemplary embodiments, the thermoelectric device may be a 24 Vdc, 5 amp electronic system that can be used in various heating and cooling applications. The thermoelectric device works by transferring and storing thermal energy into two isolated liquids flowing through liquid circuits on opposite sides of the thermoelectric device, one liquid circuit being the ambient liquid circuit and the other liquid circuit being the work liquid circuit. The thermoelectric device may be sandwiched between two micro-finned or flat plate thermal conduction plates to increase surface area contact to the liquids on each side. A high thermal conductivity thermal compound may be spread thinly and evenly on the thermoelectric device semiconductor chip(s) to ensure even contact to the thermal conduction plates.

The thermal mass (thermal energy transfer, and loss, due to transit of the fluid and exposure at the heat exchanger) of the working side of the thermoelectric device (e.g., Peltier chip) is managed by the insulation so that the thermal energy transfer is maximized at the work heat exchanger.

The Peltier chip does the work on the liquid which is transferred to/from the heat exchanger. During transit, the liquid tries to balance its thermal energy with the surrounding environment, increasing the thermal mass of the working side of the device. Lower thermal conductivity materials slow the transfer of thermal energy, thermal flux, lowering the thermal mass acting on the liquid and essentially the overall thermal load that the system has to manage.

The ambient side of the unit may be designed with high conductivity materials to maximize the thermal mass acting on the liquid in order to keep the temperature of the non-working side of the Peltier chip as close to the ambient environment as possible, effectively increasing the maximum differential potential of the thermoelectric device.

In the grow box, the thermal load on this system will be the amount of thermal energy it is able to transfer from the ambient air surrounding the work heat exchanger into the liquid of the work liquid circuit plus the losses through transit from and to the work heat exchanger. An objective is to focus the transfer of thermal energy at the work heat exchanger using the Peltier chip as a heat pump to have the thermoelectric temperature control system control temperature as accurately as possible.

In other words, the thermal load is on the work side of the system, and the insulation may be used to control the thermal mass effected minimizing the load due to thermal flux during cooling. The load is transferred to and dissipated through the liquid and components on the ambient side. In other words, the side opposite the work side is kept as near ambient temperature as possible to maximize utilization of the Peltier chip's maximum differential of temperature (e.g., 50° C. to 70° C. depending on chip). The temperature of the liquid on the work side is determined by a PID controller monitoring the chamber temperature and the liquid temperature on the work side. A temperature sensor on the ambient side ensures that the liquid is being kept within a range from ambient, and is close to the Peltier chip to ensure that it does not overheat or fail. During heating, the thermal load is maximized on the ambient side of the Peltier chip as to load the work circuit with as much thermal energy as is desirable or possible for the components of the working side of the system.

As noted above, one or more parts that form at least a portion of the ambient side may utilize high thermal conductivity materials, have increased surface area and/or open air exposure to the ambient environment, and utilize high volumes of ambient air to achieve this result. In exemplary embodiments, an ambient heat exchanger is fluidly connected to the ambient liquid circuit, and may utilize three 50 CFM or greater fans drawing air across the ambient heat exchanger.

The liquid in the work liquid circuit is meant to be the working liquid, which moves thermal energy to and from the thermoelectric device, and moves thermal energy to and from the chamber where climate control is desired (e.g., the grow chamber). One or more parts that form at least a portion of the work side may utilize low thermal conductivity materials and/or may be heavily insulated. In exemplary embodiments, a work heat exchanger is fluidly connected to the work liquid circuit for facilitating thermal energy transfer with the climate control chamber.

The exemplary system may be electrically controlled via a microcontroller to adjust pump speeds, PWM thermoelectric device, and monitor flow and temperature of both work and ambient sides of the system. The controller may have a connector to allow an external control board to collect data from sensors for use outside the system. Alternatively or additionally, the controller may have a connector to attach a thermistor to allow the unit to run independently from an outside control interface. Alternatively or additionally, the connector of the controller may allow an outside controller to adjust setpoints (temperature, liquid flow velocity, fan speed, pump speed, etc.) and deliver temperature information to the microcontroller. A temperature setpoint can be set during construction or controlled by an external controller.

The ambient and work liquid circuits may have respective liquid manifolds that allow the liquid to be added to the circuits. The liquid may be pure distilled water or mixed with propylene glycol, or the like. The liquid circuits may be evacuated of air via the respective liquid manifolds. When the air is evacuated from the respective ambient and work liquid circuits, the thermoelectric temperature control system may be powered-on, in which at least three cooling fans on the ambient side, and two pumps, one for each closed-loop liquid circuit, will run constantly while powered. In exemplary embodiments, current flow to the thermoelectric device module is controlled by the microcontroller and a high amp H-bridge circuit to maintain a setpoint while making sure the liquid is flowing, within desired operating temperatures, and that the fans are working properly. The microcontroller may be connected to an external control board to read all sensor data and write new setpoints as well as act as a temperature sensor for the chamber being climate controlled.

In exemplary embodiments, the two pumps are 2 GPM pumps with or without speed control. The liquid conduits may have back flow control (such as via valves) and high pressure fittings. The power source may be a 24 Vdc 5A power source, and a 24 v-to-12 v 120 watt DC-DC converter may be utilized for connection on or more components of the thermoelectric temperature control system. In exemplary embodiments, the system has a theoretical maximum of temperature differential of 70° C. (158° F.) in a 27° C. (80° F.) ambient environment at a maximum transfer rate of 55.6 watts (189.7 BTU).

In exemplary embodiments, the thermoelectric temperature control system can be expanded by connecting additional thermoelectric heat exchanger assembly units via corresponding liquid conduits such as to the respective liquid manifolds in the respective ambient and work liquid circuits. Additional 12 Vdc power sources may be connected to the additional thermoelectric devices. Where the additional thermoelectric heat exchanger assembly units utilize the existing heat exchangers, pumps, etc., it is estimated that a maximum of eight total thermoelectric heat exchanger assembly modules may be added to the thermoelectric temperature control system. The main controller may control all thermoelectric heat exchanger assembly modules simultaneously to increase heat transfer capabilities of the system.

In exemplary embodiments, portions of the thermoelectric temperature control system may be encapsulated in a modular box that can be placed into various systems or devices where temperature control is desired. The modular box may have input and output liquid connections that can be hooked up to various heat exchanger configurations.

The principles and aspects of the present invention have particular application to grow cabinets, also referred to as grow boxes, such as for growing living objects such as plants, and thus has been described above chiefly in this context. It is understood, however, that the principles and aspects of this invention may be applicable to other temperature controlled cabinets having a thermoelectric temperature control system for controlling the temperature of an internal chamber containing various types of items, such as for use in the medical industry for research of biological material, or for use with any other suitable enclosure in which it is desirable to accurately and precisely control temperature.

According to an aspect of the invention, a temperature controlled cabinet such as a grow cabinet, includes: a housing; a chamber inside of the housing for containing items; and a thermoelectric temperature control system for controlling temperature inside the chamber, the thermoelectric temperature control system comprising: a work liquid circuit having a work heat exchanger in thermal communication with an environment inside of the chamber; an ambient liquid circuit having an ambient heat exchanger in thermal communication with an ambient environment outside of the chamber; and a thermoelectric heat exchanger assembly interposed between the work liquid circuit and the ambient liquid circuit, the thermoelectric heat exchanger assembly having: a work side having a work waterblock that at least partially forms a work liquid flow passage that is fluidly connected to the work liquid circuit; an ambient side having an ambient waterblock that at least partially forms an ambient liquid flow passage that is fluidly connected to the ambient liquid circuit; and a thermoelectric device interposed between the work liquid flow passage and the ambient liquid flow passage, the thermoelectric device having a first side in thermal communication with the work liquid flow passage, and having a second side that is in thermal communication with the ambient liquid flow passage for transferring heat between the ambient liquid circuit and the work liquid circuit; wherein the ambient waterblock is made of a first material, and the work waterblock is made of a second material, the first material of the ambient waterblock having a greater thermal conductivity than the second material of the work waterblock, such that thermal transfer with an external environment on the ambient side is maximized, and thermal transfer with the external environment on the work side is minimized.

According to another aspect of the invention, a grow cabinet includes: a housing; a grow chamber inside of the housing for containing a living object; a light source and/or nutrient supply for facilitating growth of the living object; and a thermoelectric temperature control system for controlling temperature inside the grow chamber, the thermoelectric temperature control system comprising: a work liquid circuit having a work heat exchanger in thermal communication with an environment inside of the grow chamber; an ambient liquid circuit having an ambient heat exchanger in thermal communication with an ambient environment outside of the grow chamber; and a thermoelectric heat exchanger assembly interposed between the work liquid circuit and the ambient liquid circuit, the thermoelectric heat exchanger assembly having: a work side having a work liquid flow passage fluidly connected to the work liquid circuit; an ambient side having an ambient liquid flow passage fluidly connected to the ambient liquid circuit; and a thermoelectric device interposed between the work liquid flow passage and the ambient liquid flow passage, the thermoelectric device having a first side in thermal communication with the work liquid flow passage, and having a second side that is in thermal communication with the ambient liquid flow passage; wherein the thermoelectric device is configured to transfer heat between the ambient liquid circuit and the work liquid circuit for achieving and/or maintaining a desired temperature of the grow chamber.

Embodiments of the invention may include one or more features of the foregoing aspects, separately or in any combination, which may be combined with one or more of the following additional features, which may be included separately or in any combination.

In some embodiments, the thermoelectric heat exchanger assembly is configured to maximize thermal transfer with an external environment on the ambient side, and is configured to minimize thermal transfer with the external environment on the work side.

In some embodiments, the thermoelectric heat exchanger assembly is configured such that an overall thermal flux of the ambient side of the assembly is greater than an overall thermal flux of the work side of the assembly.

In some embodiments, the work side of the thermoelectric heat exchanger assembly is more thermally insulative than the ambient side of the assembly.

In some embodiments, one or more parts of the thermoelectric heat exchanger assembly that form at least a portion of the ambient side are made of one or more high thermal conductivity materials.

In some embodiments, one or more parts of the thermoelectric heat exchanger assembly that form at least a portion of the work side are made of one or more low thermal conductivity materials.

In some embodiments, a material of the ambient side of the thermoelectric heat exchanger assembly that surrounds at least a portion the ambient liquid flow passage is made of a higher thermal conductivity than a material of the work side of the thermoelectric heat exchanger assembly that surrounds at least a portion of the work liquid flow passage.

In some embodiments, the ambient side of the thermoelectric heat exchanger assembly includes an ambient waterblock that forms at least a portion of the ambient liquid flow passage.

In some embodiments, the work side of the thermoelectric heat exchanger assembly includes a work waterblock that forms at least a portion of the work liquid flow passage.

In some embodiments, the ambient waterblock is made of metal.

In some embodiments, the work waterblock is made of polymer.

In some embodiments, the work side of the thermoelectric heat exchanger assembly includes thermal insulation that covers a majority of the work waterblock.

In some embodiments, a majority of the ambient waterblock is exposed to the ambient environment.

In some embodiments, the thermoelectric heat exchanger assembly further comprises a frame assembly, in which the frame assembly is configured to contain the thermal insulation and enable coupling of the thermoelectric heat exchanger assembly to the grow cabinet.

In some embodiments, a work thermal conduction plate is disposed between the work waterblock and the first side of the thermoelectric device, the work thermal conduction plate being sealingly engaged against the work waterblock to form the work liquid flow passage.

In some embodiments, an ambient thermal conduction plate is disposed between the ambient waterblock and the second side of the thermoelectric device, the ambient thermal conduction plate being sealingly engaged against the ambient waterblock to form the ambient liquid flow passage.

In some embodiments, the ambient thermal conduction plate and/or the work thermal conduction plate have a plurality of turbulizers for enhancing turbulent liquid flow.

In some embodiments, the thermoelectric heat exchanger assembly includes a thermally conductive paste on the first side and the second side of the thermoelectric device for enhancing thermal contact with the respective work thermal conduction plate and the ambient thermal conduction plate on opposite sides of the thermoelectric device.

In some embodiments, the work liquid circuit and the ambient liquid circuit are each closed-loop circuits that are fluidly isolated from each other.

In some embodiments, the work liquid circuit includes a work pump that is configured to circulate a work working liquid between the work side of the thermoelectric heat exchanger and the work heat exchanger.

In some embodiments, the thermoelectric temperature control system further comprises an impeller fan that is configured to draw air across the work heat exchanger and into the grow chamber.

In some embodiments, the ambient liquid circuit includes an ambient pump that is configured to circulate an ambient working liquid between the ambient side of the thermoelectric heat exchanger and the ambient heat exchanger.

In some embodiments, the thermoelectric temperature control system further comprises at least two axial fans that are configured to draw air across the ambient heat exchanger and into the ambient environment.

In some embodiments, the work pump is configured or controlled to operate at a lower speed than the ambient pump.

In some embodiments, the ambient liquid circuit and the work liquid circuit each include a liquid manifold for filling, draining, and/or expanding the respective ambient and work liquid circuits.

In some embodiments, the thermoelectric temperature control system further includes a controller operatively coupled to the thermoelectric device.

In some embodiments, the controller is configured to direct current through the thermoelectric device in a first direction such that heat is transferred across the thermoelectric device from the ambient liquid circuit via the ambient liquid flow passage to the work liquid circuit via the work liquid flow passage, thereby heating the work liquid, and wherein the heated work liquid is conveyed to the work heat exchanger such that the grow chamber is heated.

In some embodiments, the controller is configured to direct current through the thermoelectric device in a second direction opposite the first direction, such that heat is transferred across the thermoelectric device from the work liquid circuit via the work liquid flow passage to the ambient liquid circuit via the ambient liquid flow passage, thereby cooling the work liquid, and wherein the cooled work liquid is conveyed to the work heat exchanger such that the grow chamber is cooled.

In some embodiments, the thermoelectric temperature control system further comprises: a chamber temperature sensor that is configured to sense a temperature of the environment inside of the grow chamber.

In some embodiments, the controller is operatively coupled to the chamber temperature sensor, the controller being configured to control an amount and/or direction of electrical current to the thermoelectric device in response to a temperature signal received from the chamber temperature sensor.

In some embodiments, the system further includes a modular box that contains at least the thermoelectric heat exchanger assembly, the ambient pump, the ambient heat exchanger, and the work pump.

In some embodiments, a liquid inlet portion of the work liquid circuit is fluidly connected to the work liquid flow passage via a work inlet port, the liquid inlet portion having an inlet connector disposed outwardly of the modular box for connecting to a work heat exchanger.

In some embodiments, a liquid outlet portion of the work liquid circuit is fluidly connected to the work liquid flow passage via a work outlet port, the liquid outlet portion having an outlet connector disposed outwardly of the modular box for connecting to the work heat exchanger.

In some embodiments, the thermoelectric temperature control system further comprises an expansion circuit, the expansion circuit having: an expanded work liquid circuit fluidly connected to the work liquid circuit; an expanded ambient liquid circuit fluidly connected to the ambient liquid circuit; and at least one additional thermoelectric heat exchanger assembly interposed between the expanded work liquid circuit and the expanded ambient liquid circuit for transferring heat between the respective expanded ambient and work liquid circuits.

In some embodiments, the work side of the thermoelectric heat exchanger assembly includes thermal insulation that covers a majority of the work waterblock.

In some embodiments, a majority of the ambient waterblock is exposed to an ambient environment.

In some embodiments, the first material of the ambient waterblock is a metal, wherein the second material of the work waterblock is a polymer, and wherein the thermal insulation is made of aerogel.

It is understood that embodiments of the subject matter described in this specification can be implemented in combination with digital electronic circuitry, controllers, processors, computer software, firmware, and/or hardware. For example, embodiments may be implemented in a thermoelectric temperature control system that uses one or more modules of computer program instructions encoded on a non-transitory computer-readable medium for execution by, or to control the operation of, data processing apparatus.

In the flow diagram(s), blocks may denote "processing blocks" that may be implemented with logic. The processing blocks may represent a method step or an apparatus element for performing the method step. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components.

"Logic," as used herein, includes but is not limited to hardware, firmware, software or combinations of each to perform a function(s) or an action(s), or to cause a function or action from another logic, method, or system. F or example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

Algorithmic descriptions and representations used herein are the means used by those skilled in the art to convey the substance of their work to others. An algorithm or method is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like. It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities.

Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities. It will be appreciated that the processes may be implemented using various programming approaches like machine language, procedural, object oriented or artificial intelligence techniques. In one example, methodologies are implemented as processor executable instructions or operations provided on a computer-readable medium. Thus, in one example, a computer-readable medium may store processor executable instructions operable to perform a method. The computer-readable medium may be a hard-drive, a machine-readable storage device, a memory device, or a combination of one or more of them.

The controller may include all apparatus, devices, and machines for processing data, including by way of example a programmable processor, a computer, or multiple processors or computers. The controller may include, in addition to hardware, code that creates an execution environment for the computer program in question. The computer program (also referred to as software or code), may be deployed in any form, including as a stand-alone program or as a module, component, subroutine, or other unit suitable for use in a computing environment. The computer program may be deployed to be executed on one computer or on multiple computers that are located at one site or distributed across multiple sites and interconnected by a communication network. The processor may include all apparatus, devices, and machines suitable for the execution of a computer program, which may include, by way of example, both general and special purpose microprocessors, and any one or more processors of any kind of digital computer. Generally, the processor will receive instructions and data from a read-only memory or a random access memory or both. The computer may include, or be operatively coupled to receive data from or transfer data to, or both, one or more mass storage devices for storing data. Devices suitable for storing computer program instructions and data include all forms of non-volatile memory, media and memory devices, including by way of example semiconductor memory devices. The processor and the memory can be supplemented by, or incorporated in, special purpose logic circuitry.

To provide for interaction with a user, embodiments may be implemented using a computer having a display device and an input device. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. Embodiments may include a computing system that includes a back-end component (e.g., as a data server), or that includes a middleware component (e.g., an application server), or that includes a front-end component (e.g., a client computer having a graphical user interface through which a user can interact with an implementation of the subject matter described is this specification), or any combination of one or more such back-end, middleware, or front-end components. The components of the system can be interconnected by any form or medium of digital data communication.

As used herein, "operable connection," or "operative connection," or a connection by which entities are "operably connected" or "operatively connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A grow cabinet comprising:
   a housing;
   a grow chamber inside of the housing for containing a living object;
   a light source and/or nutrient supply for facilitating growth of the living object; and
   a thermoelectric temperature control system for controlling temperature inside the grow chamber, the thermoelectric temperature control system comprising:
      a work liquid circuit having a work heat exchanger in thermal communication with an environment inside of the grow chamber;
      an ambient liquid circuit having an ambient heat exchanger in thermal communication with an ambient environment outside of the grow chamber; and
      a thermoelectric heat exchanger assembly interposed between the work liquid circuit and the ambient liquid circuit, the thermoelectric heat exchanger assembly having:
         a work side having a work liquid flow passage fluidly connected to the work liquid circuit;
         an ambient side having an ambient liquid flow passage fluidly connected to the ambient liquid circuit; and
         a thermoelectric device interposed between the work liquid flow passage and the ambient liquid flow passage, the thermoelectric device having a first side in thermal communication with the work liquid flow passage, and having a second side that is in thermal communication with the ambient liquid flow passage;
         wherein the thermoelectric device is configured to transfer heat between the ambient liquid circuit and the work liquid circuit for achieving and/or maintaining a desired temperature of the grow chamber.

2. The grow cabinet according to claim 1, wherein the thermoelectric heat exchanger assembly is configured to maximize thermal transfer with an external environment on the ambient side, and is configured to minimize thermal transfer with the external environment on the work side.

3. The grow cabinet according to claim 1, wherein the thermoelectric heat exchanger assembly is configured such that an overall thermal flux of the ambient side of the assembly is greater than an overall thermal flux of the work side of the assembly.

4. The grow cabinet according to claim 1, wherein the work side of the thermoelectric heat exchanger assembly is more thermally insulative than the ambient side of the assembly.

5. The grow cabinet according to claim 1, wherein a material of the ambient side of the thermoelectric heat exchanger assembly that surrounds at least a portion the ambient liquid flow passage is made of a higher thermal conductivity than a material of the work side of the thermoelectric heat exchanger assembly that surrounds at least a portion of the work liquid flow passage.

6. The grow cabinet according to claim 1,
   wherein the ambient side of the thermoelectric heat exchanger assembly includes an ambient waterblock that forms at least a portion of the ambient liquid flow passage; and
   wherein the work side of the thermoelectric heat exchanger assembly includes a work waterblock that forms at least a portion of the work liquid flow passage.

7. The grow cabinet according to claim 6,
   wherein the ambient waterblock is made of metal; and
   wherein the work waterblock is made of polymer.

8. The grow cabinet according to claim 6, wherein the work side of the thermoelectric heat exchanger assembly includes thermal insulation that covers a majority of the work waterblock.

9. The grow cabinet according to claim 8, wherein a majority of the ambient waterblock is exposed to the ambient environment.

10. The grow cabinet according to claim 6,
    wherein a work thermal conduction plate is disposed between the work waterblock and the first side of the thermoelectric device, the work thermal conduction plate being sealingly engaged against the work waterblock to form the work liquid flow passage; and
    wherein an ambient thermal conduction plate is disposed between the ambient waterblock and the second side of the thermoelectric device, the ambient thermal conduction plate being sealingly engaged against the ambient waterblock to form the ambient liquid flow passage.

11. The grow cabinet according to claim 10, wherein the ambient thermal conduction plate and/or the work thermal conduction plate have a plurality of turbulizers for enhancing turbulent liquid flow.

12. The grow cabinet according to claim 10, wherein the thermoelectric heat exchanger assembly includes a thermally conductive paste on the first side and the second side of the thermoelectric device for enhancing thermal contact with the respective work thermal conduction plate and the ambient thermal conduction plate on opposite sides of the thermoelectric device.

13. The grow cabinet according to claim 1, wherein the thermoelectric temperature control system further comprises an impeller fan that is configured to draw air across the work heat exchanger and into the grow chamber.

14. The grow cabinet according to claim 1, wherein the ambient liquid circuit includes an ambient pump that is configured to circulate an ambient working liquid between the ambient side of the thermoelectric heat exchanger and the ambient heat exchanger;
wherein the work liquid circuit includes a work pump that is configured to circulate a work working liquid between the work side of the thermoelectric heat exchanger and the work heat exchanger; and
wherein the work pump is configured or controlled to operate at a lower speed than the ambient pump.

15. The grow cabinet according to claim 14, further comprising a modular box that contains at least the thermoelectric heat exchanger assembly, the ambient pump, the ambient heat exchanger, and the work pump;
wherein a liquid inlet portion of the work liquid circuit is fluidly connected to the work liquid flow passage via a work inlet port, the liquid inlet portion having an inlet connector disposed outwardly of the modular box for connecting to a work heat exchanger; and
wherein a liquid outlet portion of the work liquid circuit is fluidly connected to the work liquid flow passage via a work outlet port, the liquid outlet portion having an outlet connector disposed outwardly of the modular box for connecting to the work heat exchanger.

16. The grow cabinet according to claim 1,
wherein the thermoelectric temperature control system further includes a controller operatively coupled to the thermoelectric device;
wherein the controller is configured to direct current through the thermoelectric device in a first direction such that heat is transferred across the thermoelectric device from the ambient liquid circuit via the ambient liquid flow passage to the work liquid circuit via the work liquid flow passage, thereby heating the work liquid, and wherein the heated work liquid is conveyed to the work heat exchanger such that the grow chamber is heated; and
wherein the controller is configured to direct current through the thermoelectric device in a second direction opposite the first direction, such that heat is transferred across the thermoelectric device from the work liquid circuit via the work liquid flow passage to the ambient liquid circuit via the ambient liquid flow passage, thereby cooling the work liquid, and wherein the cooled work liquid is conveyed to the work heat exchanger such that the grow chamber is cooled.

17. The grow cabinet according to claim 16, wherein the thermoelectric temperature control system further comprises:

a chamber temperature sensor that is configured to sense a temperature of the environment inside of the grow chamber;
wherein the controller is operatively coupled to the chamber temperature sensor, the controller being configured to control an amount and/or direction of electrical current to the thermoelectric device in response to a temperature signal received from the chamber temperature sensor.

18. A temperature controlled cabinet such as a grow cabinet, comprising:
a housing;
a chamber inside of the housing for containing items; and
a thermoelectric temperature control system for controlling temperature inside the chamber, the thermoelectric temperature control system comprising:
a work liquid circuit having a work heat exchanger in thermal communication with an environment inside of the chamber;
an ambient liquid circuit having an ambient heat exchanger in thermal communication with an ambient environment outside of the chamber; and
a thermoelectric heat exchanger assembly interposed between the work liquid circuit and the ambient liquid circuit, the thermoelectric heat exchanger assembly having:
a work side having a work waterblock that at least partially forms a work liquid flow passage that is fluidly connected to the work liquid circuit;
an ambient side having an ambient waterblock that at least partially forms an ambient liquid flow passage that is fluidly connected to the ambient liquid circuit; and
a thermoelectric device interposed between the work liquid flow passage and the ambient liquid flow passage, the thermoelectric device having a first side in thermal communication with the work liquid flow passage, and having a second side that is in thermal communication with the ambient liquid flow passage for transferring heat between the ambient liquid circuit and the work liquid circuit;
wherein the ambient waterblock is made of a first material, and the work waterblock is made of a second material, the first material of the ambient waterblock having a greater thermal conductivity than the second material of the work waterblock, such that thermal transfer with an external environment on the ambient side is maximized, and thermal transfer with the external environment on the work side is minimized.

19. The temperature controlled cabinet according to claim 18, wherein the work side of the thermoelectric heat exchanger assembly includes thermal insulation that covers a majority of the work waterblock; and
wherein a majority of the ambient waterblock is exposed to an ambient environment.

20. The temperature controlled cabinet according to claim 18, wherein the first material of the ambient waterblock is a metal, wherein the second material of the work waterblock is a polymer, and wherein the thermal insulation is made of aerogel.

* * * * *